June 5, 1928.

A. B. BACHMANN 1,672,744

MILLING MACHINE

Filed May 20, 1921    15 Sheets-Sheet 1

Alvin B. Bachmann, INVENTOR.

BY

Prindle, Wright & Small ATTORNEYS

June 5, 1928. 1,672,744
A. B. BACHMANN
MILLING MACHINE
Filed May 20, 1921    15 Sheets-Sheet 3

Alvin B. Bachmann
INVENTOR.

BY
Priddle Wright & Snell
ATTORNEYS.

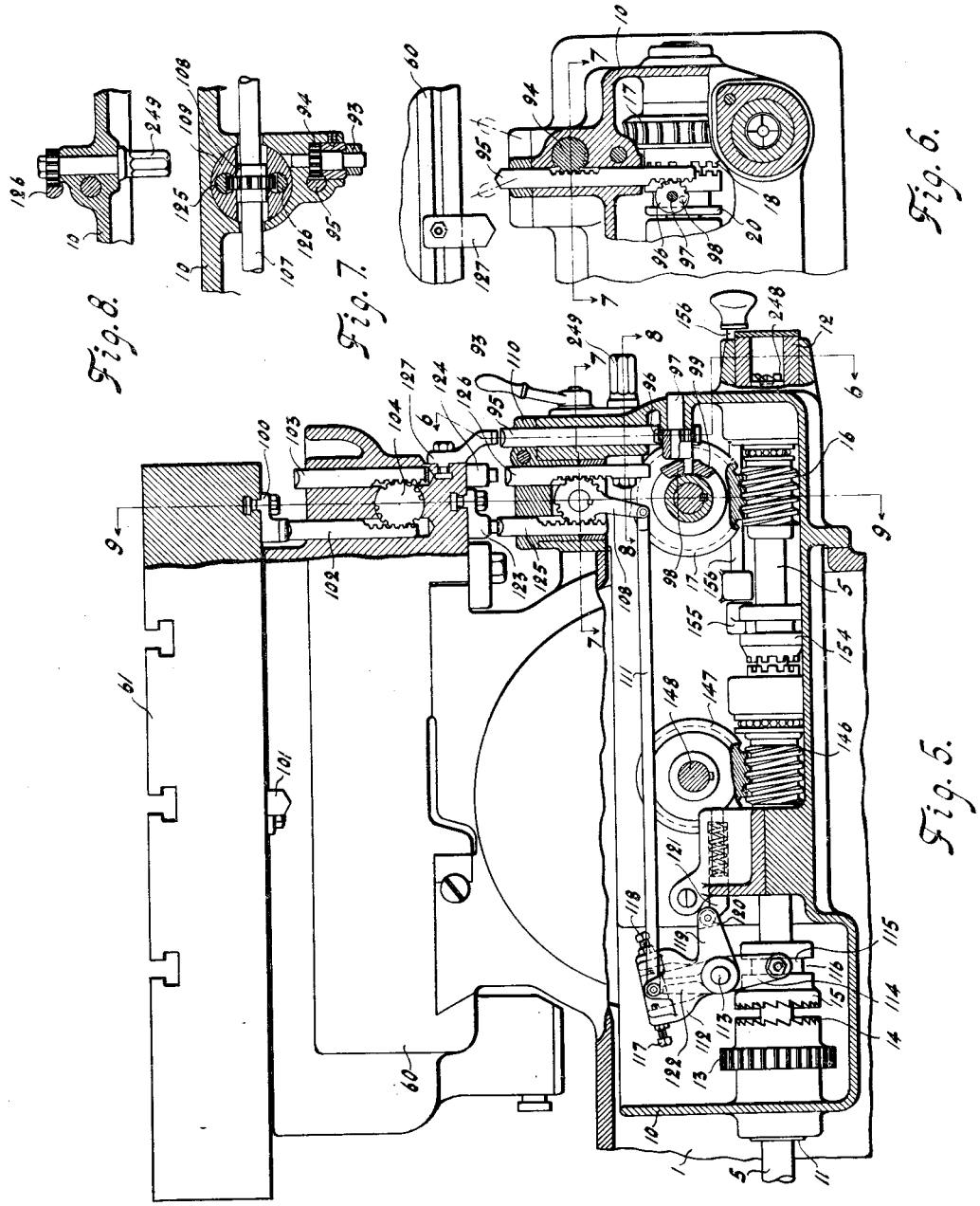

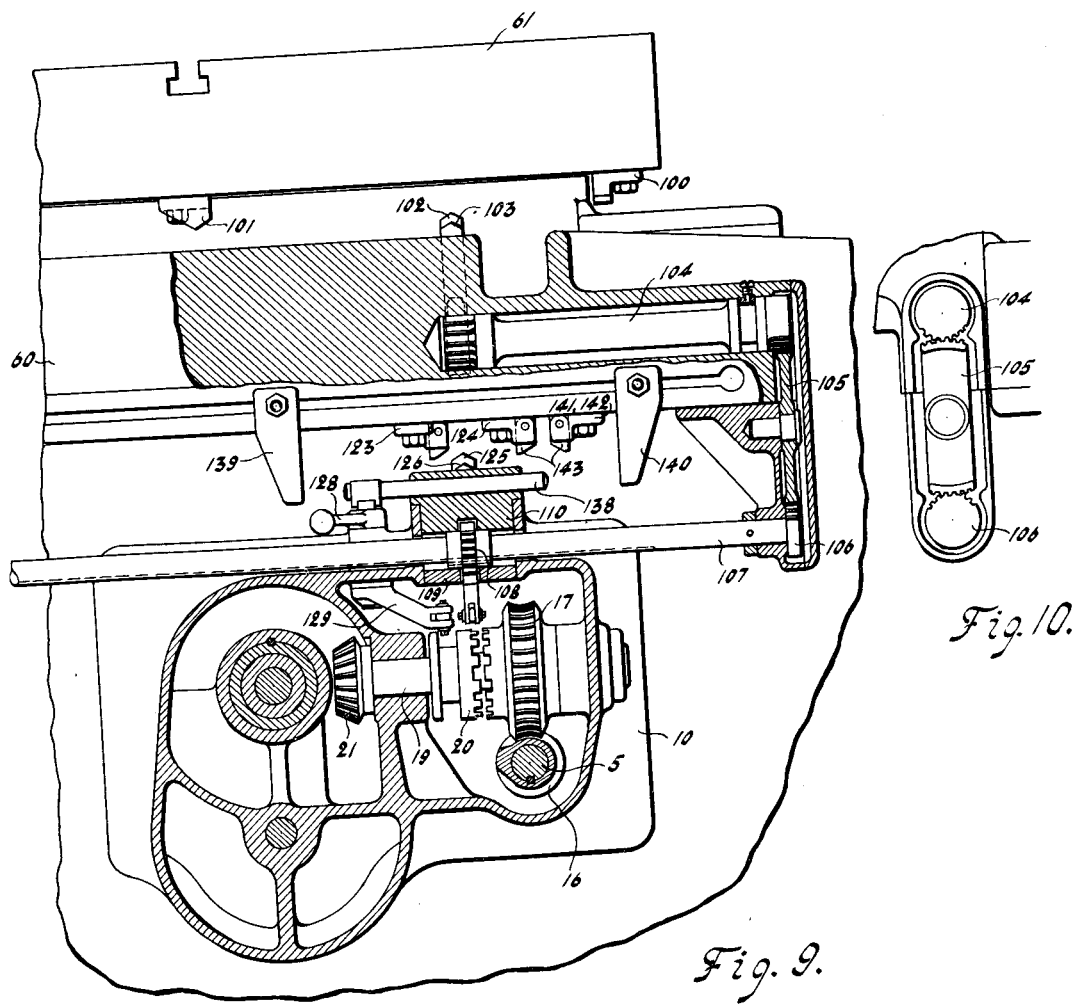

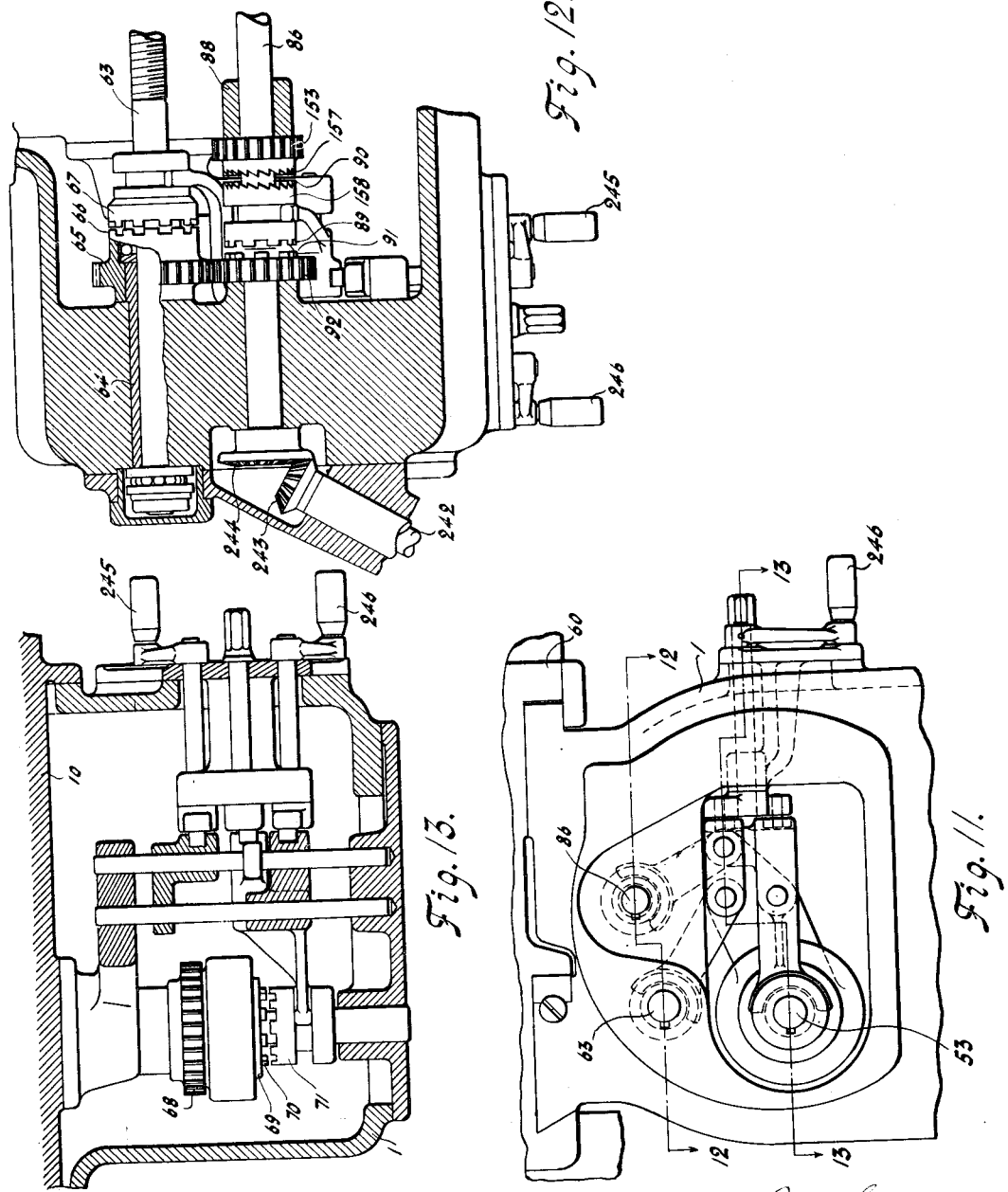

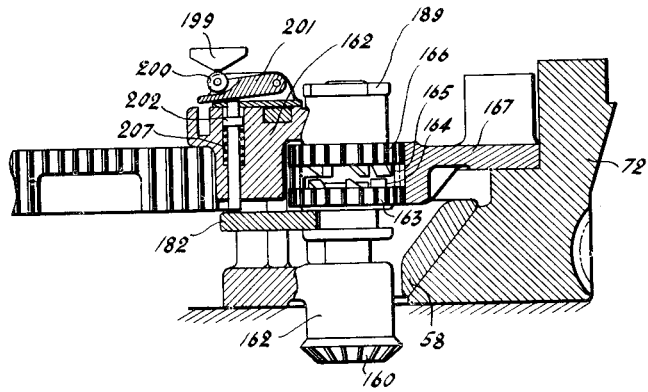
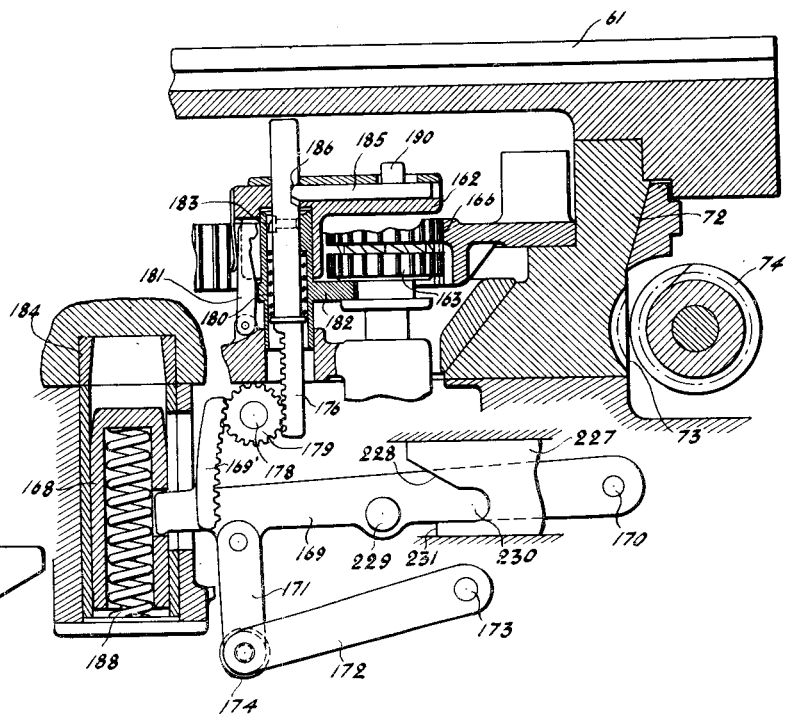

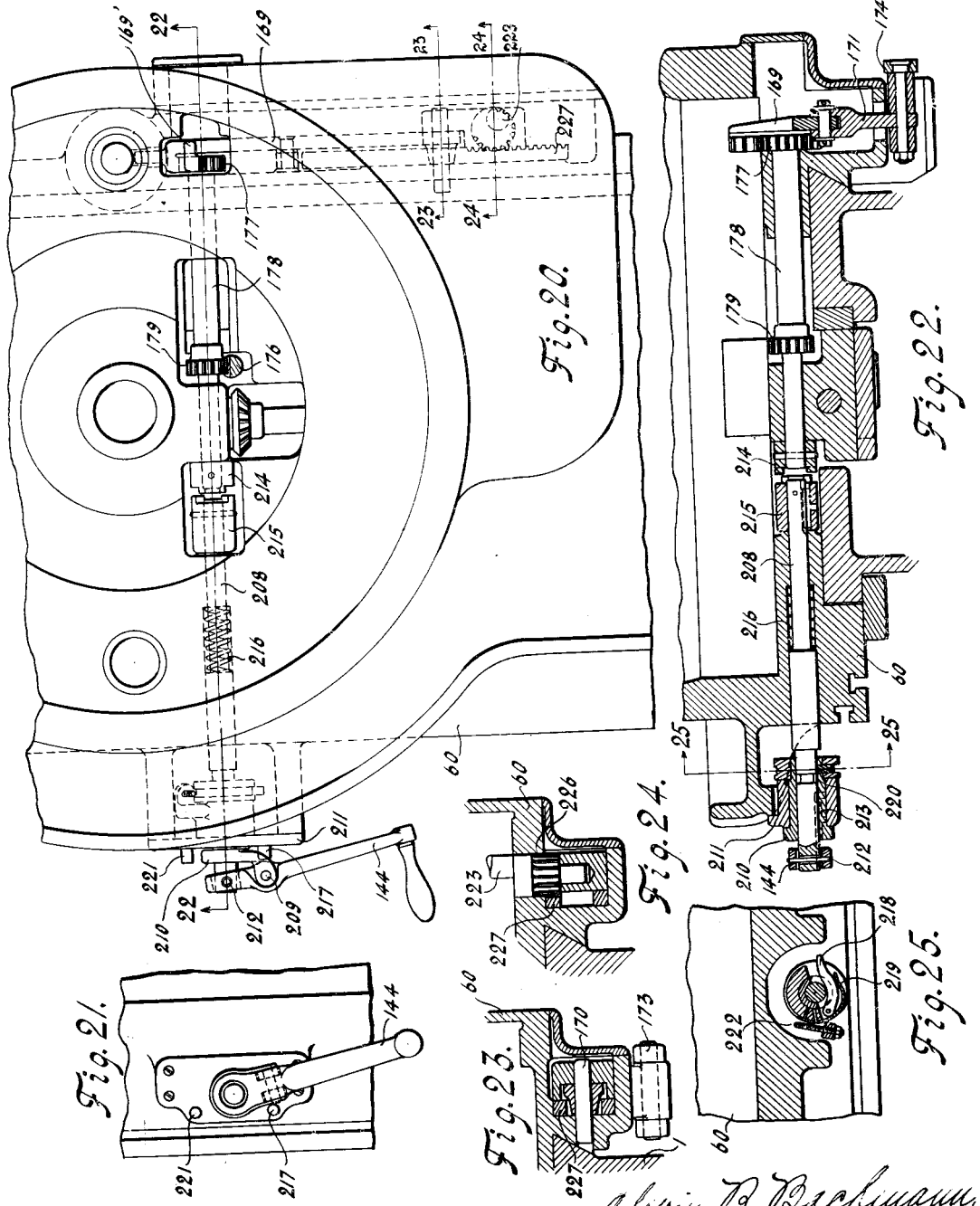

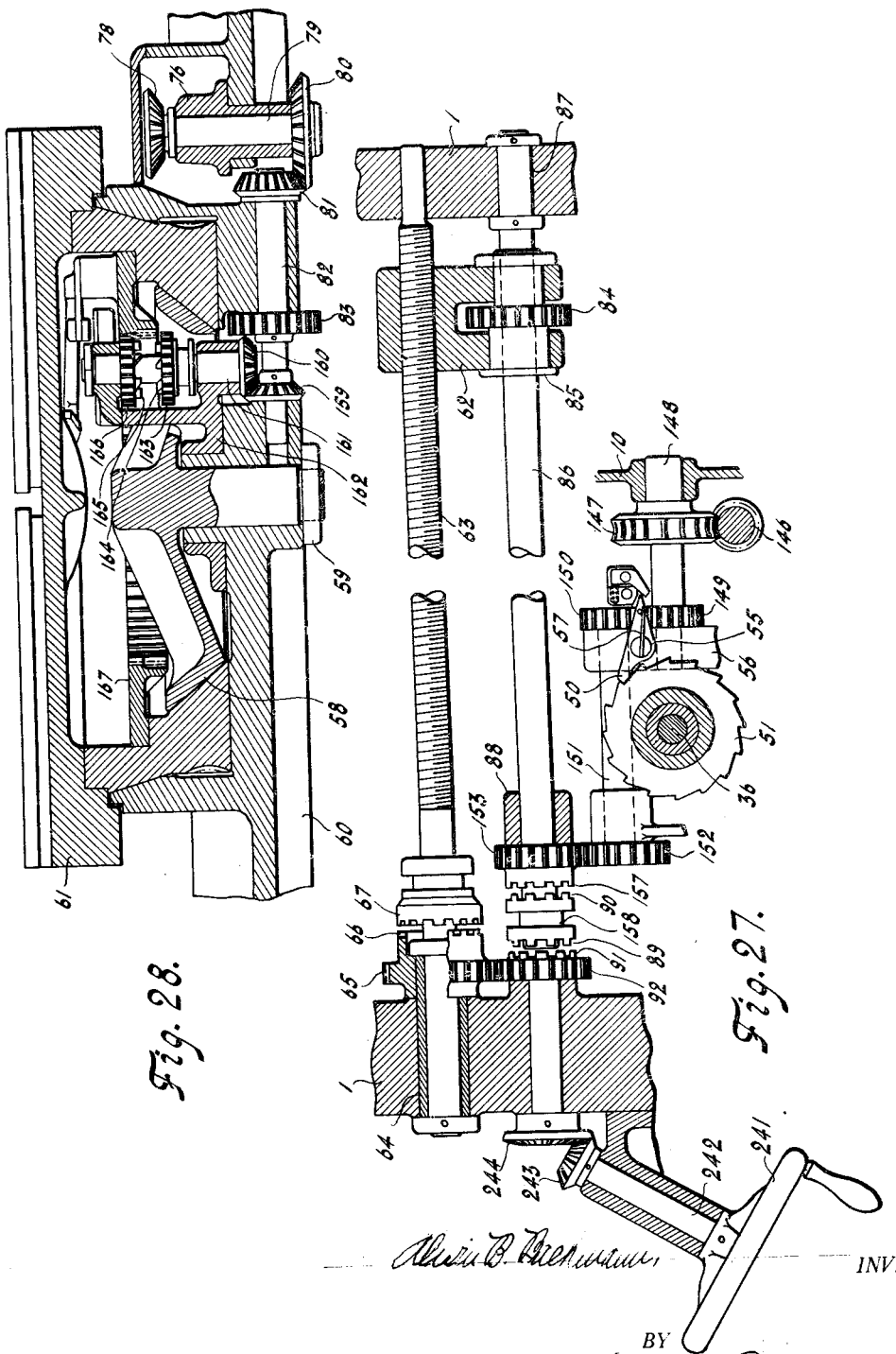

June 5, 1928.

A. B. BACHMANN 1,672,744

MILLING MACHINE

Filed May 20, 1921    15 Sheets-Sheet 14

Erwin B. Bachmann,
INVENTOR.

BY
Brindle, Wright & Small
ATTORNEYS.

June 5, 1928.

A. B. BACHMANN 1,672,744

MILLING MACHINE

Filed May 20, 1921  15 Sheets-Sheet 15

INVENTOR.

BY

ATTORNEY.

Patented June 5, 1928.

1,672,744

UNITED STATES PATENT OFFICE.

ALWIN B. BACHMANN, OF BROOKLYN, NEW YORK.

MILLING MACHINE.

Application filed May 20, 1921. Serial No. 471,061.

This invention relates to milling machines, and to a method of operation of such machines. As to the machine itself, my invention contemplates, among other objects, the provision of a milling machine free from deficiencies which inhere in prior milling machines having a reciprocating or rotating work-table, by which the work is fed in a straight line under the cutting tool and returned to initial position, or continuously fed in a circular path under the cutting tool.

The prior milling machines referred to comprise several types, which it will be necessary to briefly mention in order to indicate the object of the present invention, just stated.

The prior milling machines here referred to may be classed in two groups—one employing a reciprocating work-table, whereby the work-piece is fed in a straight line under the cutting tool and returned in the same path to initial position, and the other employing a rotating work-table, whereby a plurality of work-pieces placed off center thereof will be fed in a circular movement under the cutting tool, and which work-pieces successively return to initial position where they can be removed and new work-pieces placed upon the table.

The development of these machines shows the tendency in the art to reduce the non-cutting or non-productive time and to simplify the functions of the operator by performing the different movements of the table automatically. Thus, in both types, the feed has been rendered intermittent, by means of adjustable dogs and co-operating feeding means, whereby the feed or movement of the table under the cutter may be varied from a slow feed, when a work-piece is in position beneath the cutter, to a fast traverse, to hasten the advance of the next work-piece to the cutter, then a slow feed again while the last-mentioned work-piece is undergoing the cutting operation, and again a rapid traverse to hasten the advance of the next work-piece to cutting position; and, finally, in the case of a reciprocating slide, a rapid return after all the work-pieces have advanced beyond the cutter, back to the initial position.

While, in the second type, employing a rotating work-table, work-pieces may be set or removed while the table is rotating and a work-piece passing under the cutter, this type can advantageously be used only with work-pieces of circular shape or for face milling, since the work-pieces upon the rotating table transcribe a circular path under the cutting tool. Another disadvantage of this type is the necessity of employing numerous work-holding fixtures, the expense of which is warranted only when milling parts in very large quantities.

A third type has been developed in an endeavor to eliminate the idle time occurring in the first type of machine by the necessity of stopping the work-table when setting or removing a work-piece, by the employment of two work-tables mounted upon a swivel, upon one of which the work is being cut while new work is being set upon the other, the two tables being successively swivelled into working relation to the cutter. This third type, however, requires a multiplication of parts which is in itself objectionable and further tends to inaccuracy of work; and moreover, requiring so large a turret for the two swivelling work-tables or so great an overhang of the tables upon the turret as to form a source of inconvenience to the operator.

One of the objects contemplated by the present invention is to provide a single work-table of the reciprocating type in its feed, traverse and return, and to provide means for removing a finished piece of work and setting a new piece while the table is in motion, and without the multiplicity of parts employed in the third type referred to.

Another object of the present invention is to provide in one machine the various movements of the work in feed, traverse and return hithertofore possible only in the several types of machines of the prior art, and thereby to combine in one compact machine the certain distinct advantages of the several types of the prior art. Thus, each of the heretofore-mentioned types of machine offers certain advantages in handling certain classes of work, but a class of work which could be advantageously handled by one type of machine could not generally be advantageously or economically handled by another type. For example, the rotating table type of machine is employed, as heretofore stated, for work-pieces of circular shape or for face milling, which work could not be so advantageously or economically done upon the straight reciprocating table type of machine. Therefore, no one of the heretofore-mentioned types of machine offers the advantage of being always able to employ the most efficient and most economical way of milling for all classes of work. It is, therefore, an object of the present invention to provide a work-table and means for so moving that work-table, that the single compact machine may be employed in performing substantially the same movements of the work-pieces as in any one of the heretofore-mentioned types of machine.

Another object of the invention is to accomplish a return of the finished work-pieces to initial position without such return describing a path of the work-pieces underneath the cutter, and thus avoiding any possible marring or injury to the finished work-pieces by the cutter, such as may possibly occur in the straight reciprocating table type of machine hereto referred to in which the work-table in its return to initial position returns the finished work-piece again underneath the cutter.

Still another object of my invention is to provide for a feeding and traverse of the work-table in either direction underneath the cutter.

Further objects of my invention will appear from the detailed description of a preferred embodiment thereof later to be given.

To accomplish the objects heretofore stated and other objects which will later appear in the detailed description of a preferred embodiment of my improved machine and of various methods of operating thereof, my improved machine includes a work-table and driving means therefor whereby any of the following methods of operation may be performed at will:

(1) A reciprocation of the table in a straight path underneath the cutter,
 (a) with a slow feeding movement continuously in either direction, or
 (b) with an intermittently slow feeding and rapid traversing movement continuously in either direction, or
 (c) with an intermittently slow feeding movement and a rapid traverse, and a rapid return;

(2) A rotation of the table without reciprocation either slowly or rapidly continuously, or intermittently with a slow feed and rapid traverse;

(3) A reciprocation of the table in forward feeding and traversing movement and return to initial position, and then a partial rotation or indexing of the table to present a new work-piece in proper relation to the cutter;

(4) A reciprocation of the table in feeding and traversing moments under the cutter and after the last work-piece has advanced beyond the cutter to finished position, and indexing movement of the table simultaneously with the return movement of the table in its reciprocatory path to provide a new work-piece in proper relation to the cutter.

By the movements mentioned in paragraph (1) above, all the advantages of the reciprocating table type of milling machine are present, while by the movements set forth in paragraph (2), all the advantages of the rotating table type of milling machine are present, and by the movements set forth in paragraphs (3) and (4), all the advantages of the double swivel table type of machine are present, without the disadvantages thereof heretofore mentioned.

The partial rotative movement termed an indexing movement of the table mentioned in paragraphs (3) and (4) is distinct and for a different purpose than the complete rotation of the table set forth in paragraph (2). When the movements set forth in paragraphs (3) and (4) are employed, any desired number of work-pieces may be placed upon the table in such symmetrical relation to the center of the table that when the table is reciprocated to pass one or a plurality of work-pieces of one side of the center beneath the cutter, partial rotations of the table through the proper degrees will successively bring the symmetrically placed work-pieces on the opposite side of the center from the first-mentioned work-pieces which have been finished, into position to be operated on by the cutter when the table is again advanced in a straight-line movement. Thus if but two work-pieces are placed upon the table one on one side of the center in position upon the first reciprocation of the table to pass beneath the cutter and the other work-piece is placed on the opposite side of the center of the table an indexing of the table through 180 degrees, after the first work-piece is finished, will bring the second work-piece in position whereby the next reciprocation of the table will bring that work-piece beneath the cutter. If a plurality of work-pieces are symmetrically placed upon the table, the indexing movement of the table will be through a correspondingly less number of degrees.

Performing the return movement of the table in its reciprocatory path before performing the indexing movement of the table to present a new work-piece for the cutter, as set forth in paragraph (3), is of great advantage in all cases where the removing of the finished work and the setting of a new piece of work upon the table takes a longer time than the forward cutting and return movement of the table. In cases, however, where the forward cutting and return movement of the table takes a longer time than removing work already finished from the table and setting new work thereon, it is of greater advantage to perform the indexing of the table during its return movement in the reciprocatory path, as set forth in paragraph (4) above.

This simultaneous indexing movement and return movement of the table, in addition to the saving of time involved, also returns the finished work-piece upon the table to initial position in a path, due to the indexing movement of the table, which avoids a return passage under the cutter, and therefore obviates the possibility of a marring of the finished work.

The machine provides for the various movements referred to either automatically throughout the progress of the movements after an initial hand adjustment of dog tripping mechanism or by hand operating mechanism operated at will at the various stages of the desired movements.

In the foregoing a general outline of the various table movements have been given, but a still greater variety may be obtained, as will later appear from a detailed description of an illustrative embodiment of the invention and the methods of operation thereof, by first selecting a movement best suited for a certain class of work and then adjusting the automatic trip dogs later to be referred to, which dogs co-operate with the various movement transmitting means, or by manual manipulation of the mechanisms, later to be referred to, cooperating with the movement transmitting means. All these movements, in addition to the provision of hand operation during the progress of the cycle of the movements, may thus be automatically performed if desired, and the operator has then only to attend to the removing of the finished work-pieces and the placing of the new ones.

The various features of my invention will be more fully set forth in the description, and the accompanying drawings forming part of this specification, of an illustrative embodiment thereof and of various methods of its operation, but it is to be understood that my invention as to the machine is capable of embodiment in many different forms and my invention as to the methods of milling is not limited to the illustrative machine. While, therefore, I shall illustrate my invention by the best physical embodiment known to me, such embodiment is to be regarded only as typical of many possible embodiments, and my invention is not to be confined thereto.

In the drawings like characters of reference denote corresponding parts throughout all of the views, of which—

Fig. 5 is a sectional view along the line 5—5 of Fig. 1;

Fig. 6 is a sectional view along the line 6—6 of Fig. 5;

Fig. 7 is a sectional view along the line 7—7 of Figs. 5 and 6;

Fig. 8 is a sectional view along the line 8—8 of Fig. 5;

Fig. 9 is a sectional view along the line 9—9 of Fig. 5;

Fig. 10 is a partial end view of the right-hand end of Fig. 9;

Fig. 11 is a partial side elevational view of Fig. 2 looking at the right-hand side, and showing partially in full and partially in dotted lines a detailed view of the mechanism for the operation of the clutches for the hand and the power feed for the reciprocating slide and for the movements of the work-table in rotation and in indexing;

Fig. 12 is a sectional view along the line 12—12 of Fig. 11;

Fig. 13 is a sectional view along the line 13—13 of Fig. 11;

Fig. 17 is a sectional view along the line 16—16 of Fig. 14, showing the indexing mechanism in another position of operation;

Fig. 18 is a sectional view along the line 18—18 of Fig. 14, showing the indexing mechanism in a third position of operation;

Fig. 20 is a plan view of the mechanism for the operation of the indexing mechanism by hand;

Fig. 21 is a partial side view of the left-hand side of Fig. 20;

Fig. 22 is a sectional view along the lines 22—22 of Fig. 20;

Fig. 23 is a sectional view along the line 23—23 of Fig. 20;

Fig. 24 is a sectional view along the line 24—24 of Fig. 20;

Fig. 25 is a sectional view along the line 25—25 of Fig. 22;

Figs. 26, 27, 28 and 29 are views partially in section and partially in plan of the driving mechanism of the reciprocating slide, of the rotatable work-table mounted thereon, and of the mechanism for performing the two rotative movements of the work-table in milling and indexing;

As will be obvious from an inspection of the drawings, the various figures thereof are drawn to varying scales for purposes of clearness.

Figure 1:
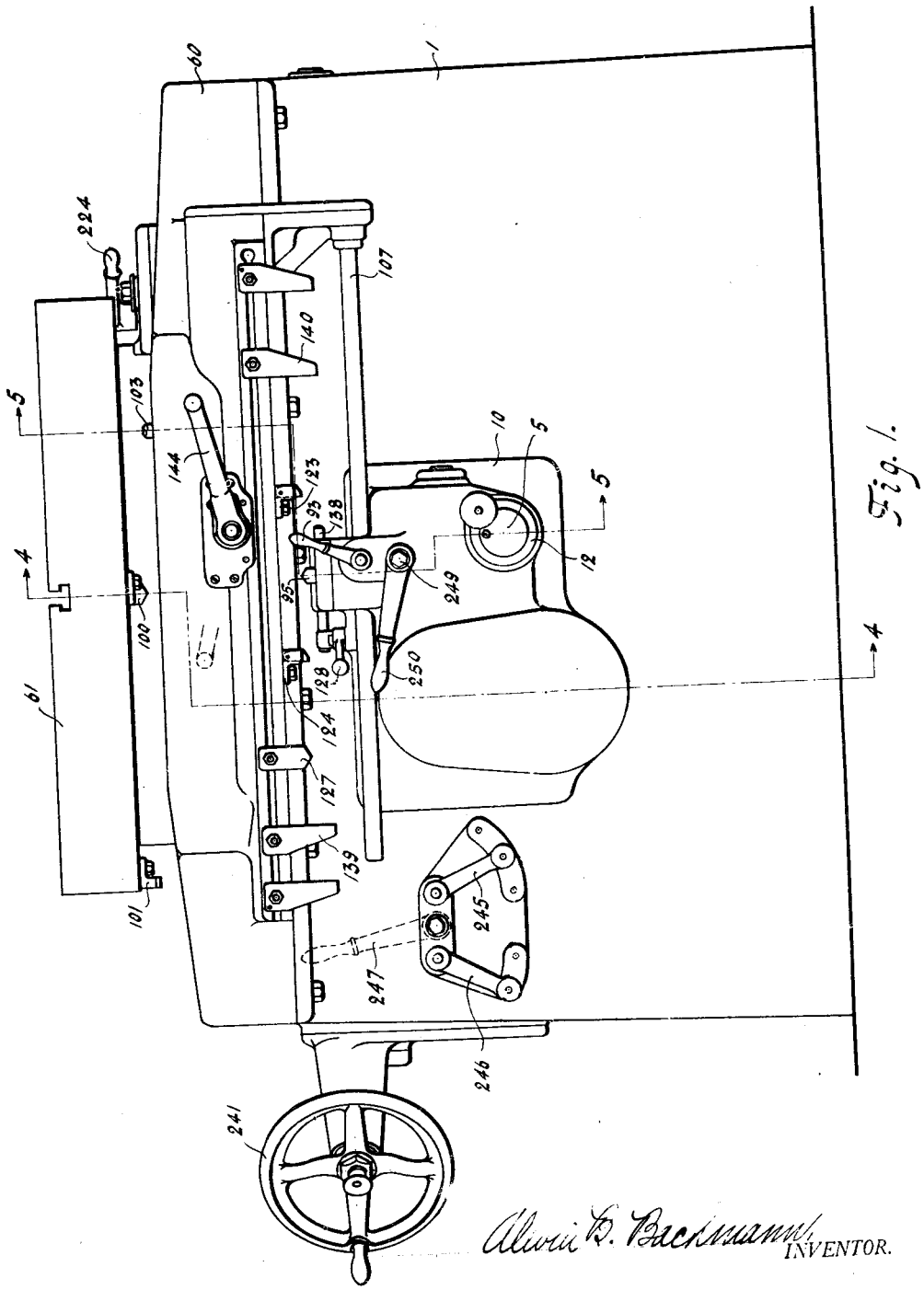
Figure 1 is a front elevation of a milling machine embodying my invention.
Figure 2:
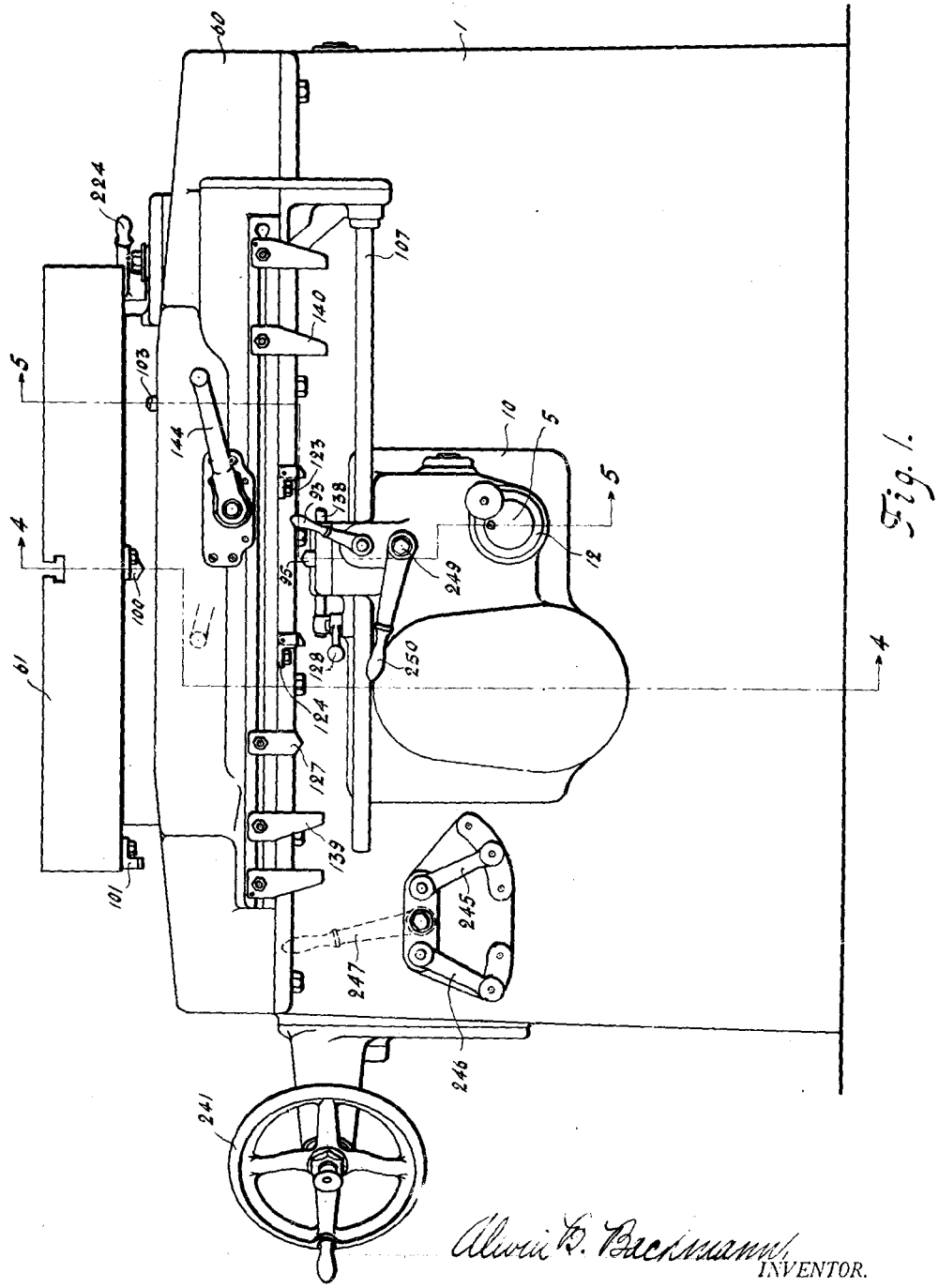
Fig. 2 is a side elevation thereof, looking at the left-hand side of Fig. 1.

As a preliminary to the more detailed description of the machine constituting the illustrative embodiment of my invention, it may be stated that the work-table, circular in form, is mounted for rotation upon a reciprocatory slide, which slide in its reciprocatory movement describes a straight path longitudinally of the machine, as viewed in Fig. 1, and at right angles to the plane of the drawing as viewed in Fig. 2, beneath the cutting tool shown in Fig. 2.

When the work-table is to be reciprocated without rotation, to accomplish the functions, among others, of a milling machine of the type hereto referred to in paragraph (1), the circular table is to be locked to the reciprocatory slide by means of a locking pin, which may be withdrawn manually by the operator at will or may be automatically withdrawn in a manner hereinafter set forth, so as to set the circular table free for complete rotation in milling or for partial rotation in indexing. When the work-table is locked to the slide and continuously reciprocated back and forth therewith, all of the functions of the first-mentioned type of milling machine may be accomplished.

In addition to this continuous reciprocation of the slide with the work-table locked thereon, at either extremity of movement of the slide, the locked pin may be withdrawn and the work-table caused to partially rotate, in what is here termed an "indexing" movement, and thereafter again locked in position on the slide to position a different portion of the work-table in the path of the cutter, thus accomplishing the functions not heretofore accomplished by the types of milling machine already referred to.

Considering now the circular work-table locked to the slide, work, fastened to the table some distance off center, may be cut by imparting a feeding movement in a straight line to the slide. During this process of cutting, work can be set at some other place on the table and in such a position as will bring the work in proper relation to the cutter when the work-table is indexed after the first work piece has been finished. For example, for two pieces of work, placed off center and symmetrically with respect to the center of the table, and one on that side of the center in line with the cutter, and the other on the opposite side of the center, when the slide has been fed forward with the table locked thereto so as to bring the first-mentioned piece of work beneath and beyond the cutter so as to be finished thereby, the slide with the work-table still locked thereto may be returned to initial position and thereafter the lock-pin withdrawn and the table indexed 180 degrees to bring the unfinished work into that path described by the first-mentioned work, the table again locked to the slide and the slide again advanced to feed the table and the new work-piece beneath the cutter, during which advance of the new work-piece, the finished work-piece may be removed and another work-piece placed upon the table in the position as before. Or, after the table has completed its first advance to bring the first-mentioned work-piece beneath and beyond the cutter to finished condition, the locked pin may be withdrawn and the indexing movement started simultaneously with the return of the slide and table to initial position, thus saving time in the indexing, and accomplishing the additional function of returning the finished work-piece in a circular path avoiding the cutter instead of a return along its original path as in the first-mentioned operation. When three work-pieces are symmetrically placed upon the table, the indexing movement referred to will be 120 degrees, and correspondingly less in proportion to the number of work-pieces.

The slide may also be maintained stationary, the work-table released from its locked relation thereto, and the work table rotated thereon for continuous milling work-pieces in a circular path, and the machine as thus operated accomplishes all the functions of the second type of milling machine heretofore referred to.

It will be observed from this outline that there are three possible driving movements; the reciprocatory movement of the slide in a straight path beneath the cutter, the continuous rotation of the work-table thereon for circular milling, and the partial rotation of the table, or indexing movement. All three of these drives are taken from a single main driving shaft. In the first two drives, provision is made for a slow feed, while the work is passing the cutter and a quick traverse to advance the work-piece to cutting position, and a quick return of the table to initial position, while the third drive, for indexing, is one of constant speed. Provision is also made for setting these three drives into operation either manually or automatically through trip dogs adjustable upon the reciprocating slide and the rotating table and co-operating with the driving mechanism in the body of the machine; and like provision is made for locking or releasing the rotatable table upon this slide either manually or by adjustable trip dogs.

By the adjustment of the trip dogs a great variety of automatic timings of the movements of slow feed, rapid traverse, return of the table and indexing of the table, can be had to correspond to the necessities of the work.

Means are also provided for disconnecting the power drives for the reciprocation of the slide and the rotation and indexing of the work-table, and for manually driving these parts, such provision being of advantage particularly in setting the trip dogs for the various timing operations when the power drive is restored.

The slow and fast feeds are not only taken from a single main driving shaft, as already stated, but such movements are also transmitted to a single intermediate transmission shaft from which single intermediate transmission shaft branch driving shafts and co-operating driving mechanisms transmit the drives to the reciprocatory slide and the rotatable table in circular milling and in indexing.

In order to provide as few clutch operations as possible, provision is made, by way of a differential speed transmission mechanism, for continuing the slow drive and superimposing thereon at will the rapid drive.

To provide for as few operating parts as possible in a machine of this character, provision is also made for a single reversing mechanism operative upon both the slow and fast movement in the milling drives mentioned, namely, the straight drive for the reciprocatory slide for straight milling and the drive for rotating the work-table in circular milling.

To meet the various conditions under which the cutting tool has to work, provision is also made by way of change gears, to vary the slow or fast drive.

As already stated, two movements are given to the rotatable work-table; one, a continuous rotation in circular milling, and the other, a partial rotation, in indexing, during both of which movements, it is obvious that the table must be unlocked for movement upon the slide; and provision is made for locking the table against the indexing movement while a continuous rotary movement is being performed, and vice versa,—that is, complementary locking in the indexing and circular table driving mechanisms.

The detailed description of the illustrative embodiment of the invention which is to follow relates to these various mechanisms thus outlined.

Proceeding now to a detailed description of the illustrative machine, numeral 1 (Fig. 1) denotes in general the frame or housing of the machine. At one side thereof, the left-hand side as viewed in Fig. 2, is the spindle column 2, while the right-hand side thereof provides a housing for the various driving mechanisms, later to be described, and a support for the reciprocating slide 60 and the rotatable table 61 thereon, later to be described in detail.

The cutter spindle column and the power transmission therethrough to operate the cutter spindle may be of the usual or any preferred construction, and the details thereof constituting no part of my invention, are not deemed essential to illustrate or describe.

The main power shaft of the machine is indicated by the numeral 3 (Fig. 2), operated in any suitable manner, a pulley 3' being here illustrated, and the power being transmitted thereto from any desired prime mover.

Figure 26:
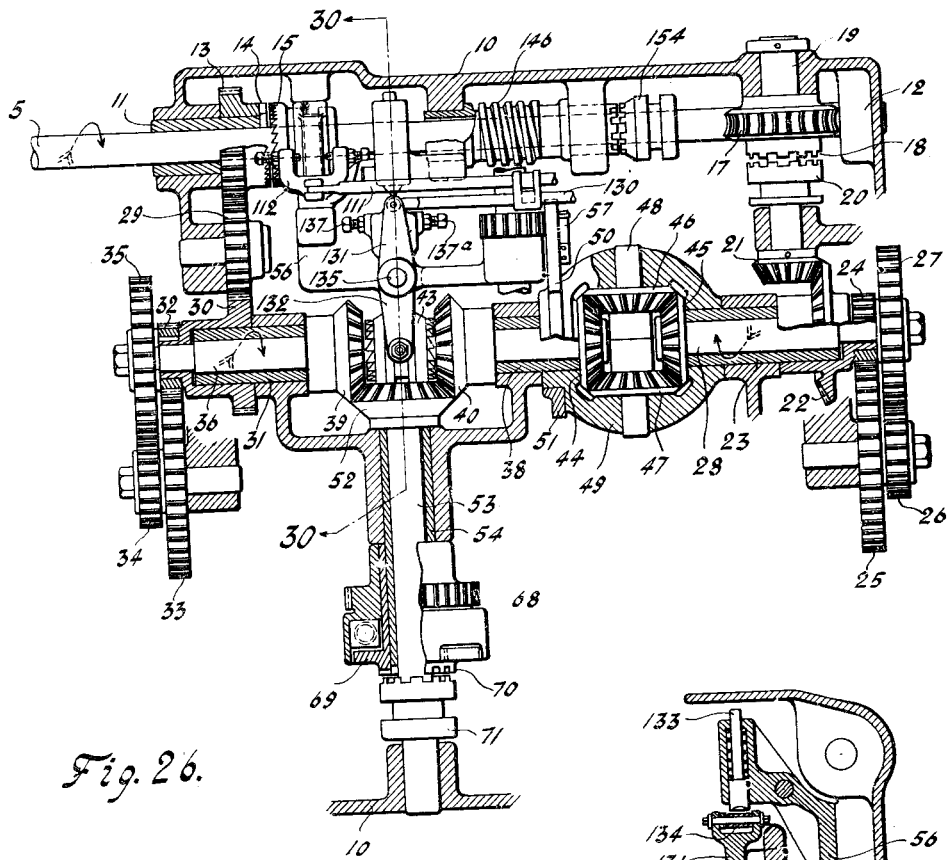

Motion for the various driving mechanisms is taken off the main pulley shaft 3 (Fig. 2), which is running at a constant speed, and transmitted to pulley 4 of the main drive or feed shaft 5, which at one end is journalled in a bearing 6 on the frame 1 (Fig. 2) and at the other end is journalled in a gear box 10 (Fig. 26).

Pulley 4 is mounted loose on the shaft 5 and is adapted to be connected by means of a friction clutch 7 (Fig. 2) to said shaft, to transmit rotary movement to said shaft. The friction clutch is under the control of a foot treadle 8, which is located conveniently to the operator, as shown in Fig. 2, and which foot treadle is connected with the clutch 7 by rod 8' and lever 9. Feed gear box 10, shown in outline in Fig. 1, is bolted to frame 1, and is provided with two bushings 11 and 12 (Figs. 1, 5 and 26), which form two additional bearings for the shaft 5 which extends through the gear box, as shown in Fig. 26.

Rotatably mounted on 11, as shown in Figs. 5 and 26, is a spur gear 13, which is provided with clutch teeth 14. Numeral 15 (Figs. 5 and 26) indicates a co-operating toothed clutch turning with and sliding on shaft 5. On the other end of the shaft is mounted and fixed thereon a worm 16 (Fig. 5) which meshes with worm-wheel 17 (Figs. 5 and 26). This worm-wheel is provided with clutch teeth 18 and is free to revolve on shaft 19 (Figs. 9 and 26) which is journalled in bearings on the gear box 10. Clutch 20 turns with and slides on shaft 19 and can be brought into mesh with worm-wheel 17. A bevelled pinion 21, fixed on shaft 19, meshes with the bevelled gear 22 (Figs. 4 and 26) which is mounted loose on bushing 23. Fixed to this bevelled gear is a change gear 24, which transmits motion over the change gears 25, 26 and 27 to shaft 28. This shaft is journalled in bushing 23, which bushing is secured in a fixed position in gear box 10, as shown in Fig. 4.

It is obvious from the foregoing, and particularly from an inspection of the layout of the gearing as shown in Fig. 26, that rotation transmitted to the shaft 5 will be transmitted at a reduced speed to the shaft 19 through the worm 16, worm-wheel 17 and clutch 20, and therefrom to the shaft 28 through the bevelled gears 21 and 22 and the series of change gears 24, 25, 26 and 27.

In a similar manner motion is transmitted from shaft 5 to shaft 36 (Figs. 4 and 26) by means of gear 13, when the clutch teeth 14 and 15 are in engagement therewith, over the idler gear 29, to spur gear 30, which is mounted loose on bushing 31, to change gear 32 fixed to spur gear 30, and through the change gears 33, 34 and 35, to the said shaft 36.

Figure 4:
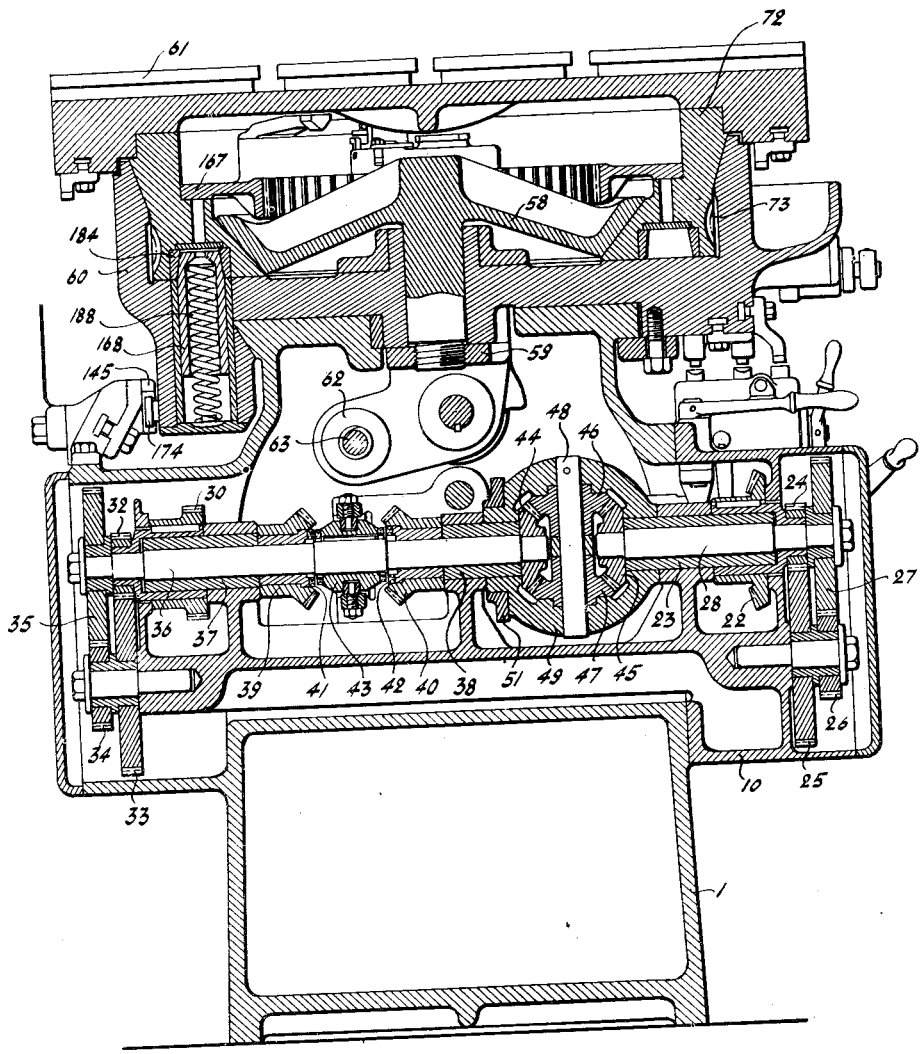
Fig. 4 is a sectional view along the line 4—4 of Fig. 1;

Shaft 36 is journalled in bushings 31 and 38, both of which are secured in a fixed position in gear box 10 as shown in Figs. 4 and 26.

*Slow and fast speed transmission from a single driving shaft.*

It is obvious from the foregoing, and particularly from an inspection of Fig. 26, that slow speed rotation is transmitted from the shaft 5 to the shaft 28, and rapid speed rotation from the shaft 5 to the shaft 36. These two speed transmissions form the origin for the slow movement of the work-table in feeding the work-piece beneath the cutter and the rapid movement of the work-table in traversing a work-piece to cutting position or in returning the table, which has already been referred to.

*Transmission of slow and fast speed from a single driving shaft to a single intermediate transmission shaft.*

These two driving movements, slow and fast, are to be transmitted over a single interconnecting shaft to branched driving connections for reciprocating the slide and rotating the work-table thereon, to accomplish which a differential speed transmission mechanism is provided to transmit these two rotative movements to the single interconnecting shaft referred to, and a single reversing means is provided for reversing the direction of slow and fast rotation transmitted over the single shaft.

*Single reversing mechanism.*

The reversing mechanism is as follows:—
Two bevelled gears 39 and 40 (Figs. 4 and 26), having toothed clutch members 41 and 42, respectively, are mounted loose on shaft 36. Between these two bevelled gears 39 and 40 is located a double toothed clutch 43 turning with and sliding on shaft 36, and designed to fix either of the gears 39 and 40 to said shaft by the alternating opposite throw of this double toothed clutch. Bevelled gears 39 and 40 are in mesh with the bevelled gear 52 (Fig. 26) which is secured to the shaft 53, this shaft being the single interconnecting shaft referred to. The shaft 53 is journalled in bushing 54, which in turn is secured in a fixed position in gear box 10.

*Differential speed transmission mechanism.*

The differential speed transmission mechanism so as to enable the single shaft 53 referred to to partake of the slow or fast speed of rotation is as follows:—Fixed upon the adjacent ends of shaft 36 and shaft 28 (Fig. 26) are the bevelled gears 44 and 45, respectively, which mesh with the two bevelled gears 46 and 47. The latter are mounted loose on the shaft 48, which is in a fixed position in the bevelled gear frame 49 (Figs. 4 and 26). This frame is free to revolve on the ends of the bushings 23 and 38 in which the shafts 28 and 36 are respectively journalled, and is provided with a toothed lock wheel 51 (Figs. 4, 26 and 27). Co-operating with this toothed lock wheel is a pawl 50 which is journalled on stud 55 secured in bracket 56 (Figs. 26 and 27), and which pawl is held in engagement with the lock wheel 51 by means of the spring 57. From the foregoing it is obvious that the gear frame 49 can turn in only one direction, as it is locked against a turning movement in the opposite direction by means of the pawl. Assuming now that clutch 20 is in mesh with the clutch teeth 18 of worm-wheel 17, motion is transmitted from shaft 5, which is rotating at a constant speed, to shaft 28, and on account of the reduction of speed through the worm and worm-wheel, the rotation of shaft 28 is at a "slow" or a "feed" rate. Assuming, however that clutch 15 is in mesh with the clutch teeth 14 on spur gear 13 and that clutch 20 is not in mesh with the clutch teeth 18, then motion is transmitted from shaft 5 to shaft 36 only and at a "fast" or "quick" traverse rate. All movements causing the advance of the straight slide 60 and the circular table 61 (Figs. 1, 2, 3, 4, 9 and 28) in either direction, either slow or fast, or intermittently slow and fast, are taken off the single shaft 53, and these movements are imparted to said shaft 53 from shaft 28 and shaft 36, in the manner heretofore stated. If motion is transmitted from shaft 5 over clutch 20 to shaft 28 in one direction, that shown by the arrow in Fig. 26, that rotation is imparted to shaft 36 in the opposite direction of rotation through the bevelled gears 45, 46, 47 and 44, but the torque of the driving force exerted through shaft 28 tends to turn the gear frame 49 with the lock wheel 51 in the same direction in which shaft 28 is rotating, that is, against the pawl 50 (Fig. 27), thus holding the frame 49 stationary. If, therefore, the rotation of shaft 5 is transmitted only through the worm 16, worm-wheel 17, clutch 20, and the various co-operating gears heretofore referred to to shaft 28, then that reduced speed of rotation of shaft 28 is transmitted to shaft 36 and from thence through the bevelled gears 39 or 40 and 52 to the single interconnecting shaft 53, and the direction of rotation of that "slow" speed is controlled by the shifting of the clutch 43 to either of the bevelled gears 39 or 40.

It will be observed from Fig. 26 that when the shaft 36 is set in rotation directly from the shaft 5 through clutch 15, gear 13, and the intermediate associated gears, in the manner heretofore referred to, the direction of rotation of shaft 36, as shown by the arrow in Fig. 26, is opposite to the direction of rotation imparted to the shaft 28 when that shaft is set in rotation from shaft 5 in the manner heretofore referred to, and that this direction of rotation of the shaft 36, although opposite to the direction of rotation of the shaft 28, is in the same direction of rotation as that which is imparted to the shaft 36 from the shaft 28 through the gears in the gear frame 49 in the manner heretofore stated.

If now it be assumed that both the clutches 15 and 20 are in engagement with their co-operating gears, then a slow rotation would be imparted to shaft 28, while at the same time a more rapid rotation would be imparted to shaft 36. In this condition the greater torque exerted upon the gear frame 49 would come from the more rapidly rotating shaft 36, and as that shaft is turning in a direction opposite to that of shaft 28, that torque would have a tendency to turn gear frame 49 in a direction opposite to that impelled by the torque from shaft 28; in other words, in a direction permitting the teeth of lock wheel 51 to ride under the pawl 50 (shown in Fig. 27), thus permitting shaft 36 and shaft 28 to rotate simultaneously and at different speeds, the gear frame 49 simply following the direction of the greater speed, and, therefore, constituting a differential speed transmission. It is also, of course, obvious that when the shafts 36 and 28 are both thus set in rotation from shaft 5, the rotation transmitted to the shaft 53 will be that of the greater speed. It is also obvious that this rotation at the greater speed can at once be changed to rotation at the slower speed by simply disengaging the clutch 15 and by thereby discontinuing the direct drive to shaft 36, when the rotation of shaft 36 will drop in speed to the slow rotation imparted thereto by the shaft 28. It is also obvious that an intermittent speed of rotation from slow to fast or fast to slow can at any time be transmitted to shaft 53 by maintaining the driving connection to shaft 28 and by connecting or disconnecting the direct drive to shaft 36 for fast rotation. It is also obvious that rotation at either of these speeds can be reversed in direction by shifting the clutch 43, and rotation of shaft 53 can be stopped altogether by disconnecting the clutch 20 if the shaft 28 is alone being driven or the clutch 15 if the shaft 36 is alone being directly driven, or both if both are being directly driven.

*Change gears in slow and fast drive.*

The speed of the "slow" or "feed" movement and the speed of the "fast" traverse or return movement may be varied by means of the change gears 24, 25, 26, 27, and 32, 33, 34 and 35, respectively; the variation of speed for the slow movement being to meet the various conditions under which the cutting tool has to work, and the variation of speed for the fast movement being for reasons which will later be explained. It should be observed, however, that to render the differential mechanism referred to operative, that is, for the frame 49 to be locked against movement when the drive imparted is the slow rotation of shaft 28 and to be unlocked to follow the faster rotation of shaft 36 when that shaft is being directly driven, the fastest "slow" movement of shaft 28 should be slower than the slowest "fast" movement of shaft 36.

Figure 3:
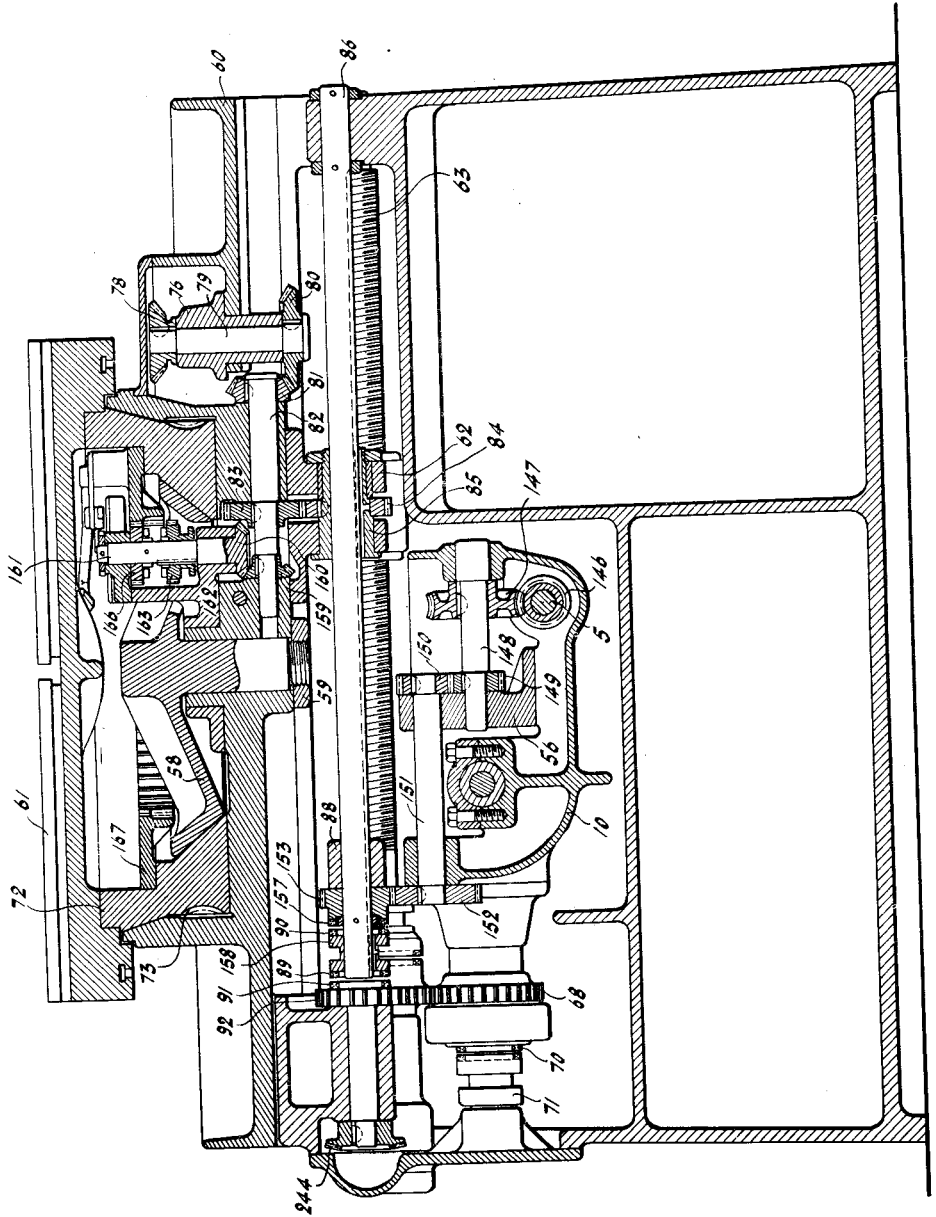
Fig. 3 is a sectional view along the line 3—3 of Fig. 2.

Proceeding now to the description of the transmission mechanism whereby the various rotations imparted to the single shaft 53 are transmitted for the reciprocatory movement of the slide 60 or for the circular milling movement of the rotatable table 61, and of the manual or automatic operation of the clutches 15, 20 and 43, it may first be stated that the slide 60 is mounted for reciprocatory movement upon the frame or housing 1, and that the table 61 is rotatably mounted upon the slide (Figs. 3, 4, and 28).

*Immediate driving mechanism for the reciprocatory slide.*

In a lug depending from the slide 60 (Fig. 4) is a nut 62, through which passes the feed screw 63 (Figs. 3, 4 and 27), the latter being journalled at one end in bushing 64 (Figs. 12 and 27) which is fixed in the housing 1, and which bushing secures the screw against an axial movement, the screw being journalled at its opposite end in the housing 1 itself (Figs. 3 and 27).

Mounted loose on bushing 64 (Figs. 12 and 27) is a gear 65, which is provided with clutch teeth 66. 67 is a co-operating toothed clutch turning with and sliding on the feed screw 63. Gear 65 meshes with the gear 68 on shaft 53 (Figs. 3 and 26), which gear 68 is formed as one half of a spring shock absorber, the other half, 69, of which is provided with clutch teeth 70 and is mounted loose on bushing 54 in which shaft 53 is journalled. A toothed clutch 71 turns with and slides on shaft 53, and when engaged to clutch member 69, transmits motion from the shaft 53 over the gears 68 and 65 and clutch 67 to the feed screw 63, which by rotation in the nut 62 attached to the reciprocatory slide, moves this slide; and as shaft 53 may be rotated fast or slow, or intermittently fast and slow, in the manner heretofore stated, as fast or slow, or intermittently fast and slow movement in either direction is imparted to the reciprocatory slide.

*The rotatable work-table and its immediate driving mechanism.*

The reciprocatory slide 60 is provided on its upper surface with an annular bearing (Figs. 3, 4, 28 and 29) to receive the circular table support 72, the latter being held in its bearing seat by the gib-plate 58, which is adjustable by the nut 59. To this support is secured the circular table 61, to which all work is fastened.

Figure 29:
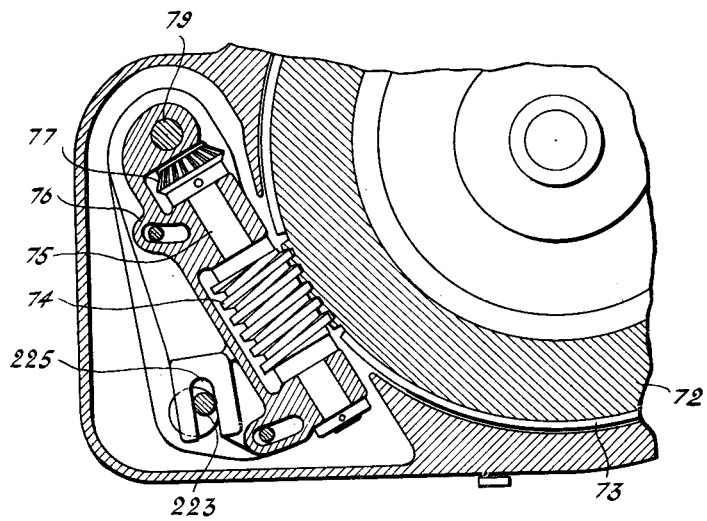

The circular table support 72 is provided with exterior peripheral gear teeth 73 (Figs. 3, 4, 15, 16, 28 and 29), in which meshes the worm 74 (see particularly Fig. 29), which worm is fixed on shaft 75, which shaft is journalled in a bracket 76, which bracket, in turn, is journalled in slide 60, as shown in Fig. 3. On the end of shaft 75 and secured to it is a bevelled gear 77, which meshes with bevelled gear 78 on the shaft 79 (Figs. 3, 28 and 29), which shaft 79 is also journalled in the bracket 76, the shaft 79 forming a fulcrum for the bracket in slide 60, as shown in Fig. 29, to permit the engagement or disengagement of worm 74 with the worm gear teeth 73 at will.

On the other end of shaft 79 is a bevelled gear 80 (Figs. 3 and 28) meshing with a bevelled gear 81 on shaft 82 which is journalled in slide 60. The shaft 82 carries fixed to it a spur gear 83, which meshes with the spur gear 84 (Figs. 3 and 27), which is fixed on sleeve 85, which sleeve is journalled in the feed screw nut 62 depending from the reciprocatory slide 60, and which sleeve 85 and spur gear 84, therefore, travel along with the reciprocatory slide. Through the sleeve 85, which is provided with a key, passes the splined shaft 86, which is journalled in bearings 87 and 88 of the housing 1.

The protruding end of shaft 86 carries a double toothed clutch 158 (Figs. 3 and 27) with teeth 89 and 90, respectively, rotating with the shaft and slidable thereon. Clutch teeth 89 may be engaged with the clutch teeth 91 on spur gear 92, the extending shaft end of this gear being journalled in housing 1, as shown in Figs. 3 and 27.

Gear 92 meshes with the gear 65, which, as stated, in turn meshes with the gear 68 on shaft 53 (Figs. 3, 26 and 27), and it is obvious that the same slow or fast, or intermittently slow and fast movement in either direction which has been imparted to shaft 53 will be imparted therefrom through the gears 68, 65 and 92 to the circular table 61 when the clutch teeth 89 are engaged with the clutch teeth 91 of the spur gear 92.

*Automatic timing of the slow, fast, or intermittent movement of the circular work-table.*

The fast, slow or intermittently fast and slow movements of the straight reciprocatory slide or of the circular work-table should, of course, be timed to meet the different conditions of the work, and, therefore, adjustable dogs are provided which travel along with the reciprocatory slide and the work-table, respectively, and on their path operate through intermediate members upon the clutches for the slow and fast drives and for the reversal of the direction of the drives.

Considering first the continuous circular movement of the work-table 61 at a slow or cutting feed, work fastened to the table will be passed under the cutter, and after being cut will be removed and replaced by an unfinished work-piece. Work-pieces milled by this method require in most instances special holding fixtures which will be arranged in circular form, and the most efficient arrangement of the work-pieces would be to arrange them so closely adjacent in a circular path that the cutting action is a continuous one, that is, that the cutter starts cutting the next work-piece before it has entirely left the piece last acted upon. This, however, depends greatly on the shape of the work-pieces and the means by which they can be held in place upon the work-table. Means for holding the work-pieces, that is, the fixtures for holding them, must be provided to form a full circle, for continuous circular milling, and this, because of the expense of the numerous holding fixtures, is only warranted when milling parts in large quantities. For smaller quantities, one, two or three fixtures may be placed upon the work-table, or any number of fixtures warranted by the quantities to be milled, and by means of the driving movements heretofore explained, the space between these fixtures can be rapidly traversed by the cutter by a rapid rotative movement of the table. This method will also be employed whenever the work-pieces are of such a shape as not to permit their close setting to each other.

*Hand operation of slow feed clutch.*

The slow feed movement for cutting will be started by means of a hand lever 93 (Figs. 1, 5, 6 and 7), which is fixed to pinion 94, plunger rack 95, pinion 96 rotatable on the stud 97, the eccentric pin 98 thereon, and the clutch shoe 99, which is operated by the eccentric pin and which enters the circular groove of the clutch 20.

*Automatic timing of rapid feed movement.*

For the quick traverse movement, dogs 100 and 101 (Figs. 1, 5 and 9) are provided, of which there may be adjustably attached to the rotatable work-table 61 as many as are desired to change the speed from a slow to a fast movement and vice versa. In the path of the dogs are plungers 102 and 103 in slide 60 (see particularly Fig. 5), both of which are provided with rack teeth, and in mesh with the pinion 104. The shaft of this pinion (see particularly Fig. 9) is provided on the end opposite the pinion, with gear teeth which transmit movement over the intermediate gear segment 105 (see Fig. 10) to the pinion 106 on shaft 107 (Fig. 9). The shaft 107 is splined and is designed to slide with the reciprocation of the slide 60 through the keyed pinion lever 108 (Figs. 5 and 9), which is held axially by the members 109 and 110 (Fig. 9), but which is free to rock around its center by any rocking movement imparted to shaft 107.

Connected to the pinion lever 108 is the clutch throw rod 111 (Figs. 5 and 26), the other end of which throw rod is connected to the forked lever 112, which forked lever is mounted to freely rock upon shaft 113, which shaft is secured in the main feed box 10 and in the bracket 56. The clutch shifter lever 114 is also mounted to freely rock upon the shaft 113 and is provided upon its lower depending arm with the shoes 115 which enter the grooves 116 in the clutch 15. This clutch shifting lever has an arm 122 upwardly extending between adjustable stop screws 117 and 118 of the lever 112. This lever 112 is U-shaped in plan view, as shown in Fig. 26, the adjustable stop screws 117 and 118 being extended through the free extremities of the U-shaped arm, as shown in Fig. 26, and the throw rod 111 being connected to the center of the U-shaped arm, as shown in Fig. 26. In side elevation, as shown in Fig. 5, the lever 112 is right-angled, having an arm 119 provided at its extremity with a roll 120, which is in contact with the bevelled spring plunger 121.

Assuming now that clutch 15 is held in the "out" position by the spring plunger 121, as shown in Fig. 5, and assuming the slow speed clutch 20 engaged and the work-table therefore rotating at a slow or feed rate, to start the quick traverse movement of the table, dog 100, carried around in a circular path upon the table, will strike with its bevelled end the similarly bevelled end of the plunger 102, and will press that plunger down, thus imparting an oscillating movement to the clutch throw rod 111 through the oscillation of the pinion lever 108 in the manner heretofore described, the clutch throw rod 111 oscillating the lever 112. The lever 112 will therefore rock around its center upon the shaft 113, but its movement will not affect the lever 114 until the screw 117 comes in contact with the end 122 of the lever 114, at which time the upper end of lever 114 is moved to the right (as viewed in Fig. 5), and the lower end is moved to the left, moving clutch 15 toward engagement with the teeth 14 of the gear 13. In the meantime roller 120 upon the laterally extending arm on lever 112 rocks downwardly and across the bevelled end of plunger 122 pushing back this plunger, which plunger, after the roller has passed its highest point, will move forwardly, or toward the left, as viewed in Fig. 5, under the impulse of its spring, and throw the clutch 15 instantaneously into full engagement, thus starting the "fast" movement.

In a similar way, by opposite direction of movement of the clutch throw rod 111 and the co-operating levers heretofore referred to, the clutch 15 will be disengaged, which is accomplished by dog 101. Dog 101 travelling now with the "fast" rotary movement of the table, will in its path of movement strike the plunger 103 and press it down, and thus imparting movement to the lever 112 in the direction opposite to that heretofore referred to. This movement will not affect lever 114 until the screw 118 comes in contact with the end 122 of the lever 114. Roller 120 again pushes back the plunger 121 and after passing the highest point of the plunger, the latter will push forward and throw the clutch out of engagement, thus returning the parts to the "slow" movement again, it being understood that the slow clutch 20 is still in engagement.

*Automatic timing of the slow and fast movement of the reciprocatory slide.*

Considering now the milling of work requiring a straight-line movement, which is accomplished by locking the circular table 61 to the straight slide 60, in the manner hereinafter described, and by taking the drive from shaft 53 over the clutch 71 and gear 68 thereon (Fig. 26) and over gear 65 co-operating with gear 68 (Fig. 27) and clutch 67 to the feed screw 63. instead of over the gear 92 and clutch teeth 91 and 89 to the shaft 86 as was required for the circular movement of table 61, it is quite obvious that all motions, "slow" and "fast", and intermittently slow and fast, are now imparted to the reciprocatory slide 60. For the starting and stopping of such motions, the adjustable dogs 123 and 124 (Figs. 1, 5 and 9) are provided upon the reciprocatory slide, of which adjustable dogs there may be as many as desired to change the movement from a slow to fast movement, or vice versa.

These dogs, in their straight-line travel, strike with their bevelled ends the like bevelled ends of the plungers 125 and 126, respectively, which plungers are mounted for upward and downward sliding movement in a plug 110 (Fig. 5) in the housing 10. Both of these plungers are provided with rack teeth (Figs. 5 and 7), which are in mesh with the pinion lever 108 heretofore referred to, and which plungers when pressed downwardly, will therefore operate the clutch 15 in exactly the same manner as has been heretofore described for the circular milling movements.

During this variation from "slow" to "fast" and return to "slow" driving movement, it is, of course, understood that clutch 20 for the slow movement of the slide is engaged with the worm-wheel 17 (Fig. 26) by means of the clutch shoe 99 manually operated in the manner heretofore stated by the lever 93 (Fig. 5). Means is provided for automatically disengaging the slow movement of the reciprocatory slide, which, it must also be understood, would be a disengagement of the slow movement of the rotating work-table if that were in operation. Such means comprises the adjustable dog 127 (Figs. 1, 5 and 6) on the reciprocatory slide 60, which dog travels along in a straight path with the slide, and on its path strikes the plunger 95, presses it down, and which plunger, as shown particularly in Fig. 6, upon its downward movement, by rack teeth thereon co-operating with teeth upon the pinion 96, rotates that pinion in a direction to move the eccentric pin 98 to shift the clutch shoe 99 (Fig. 5) to disengaging position of the clutch 20 (Fig. 26).

*Automatic means for controlling the direction of movement of the reciprocatory slide and rotatable table.*

Figure 30:
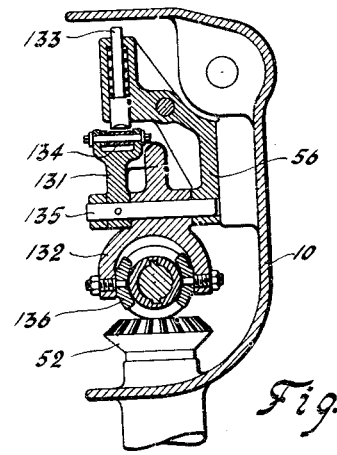
Fig. 30 is a sectional view along the line 30—30 of Fig. 26.

The direction of movement of the slide or table is controlled by the position of clutch 43 (Figs. 4 and 26) in engagement with either bevelled gears 39 or 40, and such engagement is affected by the operation of hand lever 128 (Figs. 1 and 9) which with its connecting parts 129, 130, 131, 132, 133, 134, 135, 136, 137 and 137ᵃ (Figs. 9, 26 and 30) constitute a clutch-shifting mechanism similar to the one described for the shifting of clutch 15 for the engagement of the fast drive. A hand operation of lever 128 will therefore shift clutch 43 (Figs. 4 and 26) alternately in opposite directions, to change the direction of rotation imparted to shaft 53.

For the automatic shifting of the clutch 43, there is connected to the lever 128 a shaft 138 (Figs. 1 and 9) sliding in stationary member 110 (as shown particularly in Fig. 9), said shaft being in the path of travel of two adjustable dogs 139 and 140 (Fig. 1), which are mounted on the slide 60. It is obvious that when the slide 60 is travelling in a straight path, in the plane of the drawing of Fig. 1, the dogs 139 and 140 will alternately come in engagement with opposite ends of the shaft 138 and will axially shift the same, which will accomplish the same function of shifting the clutch 43 as may be accomplished by operation of the hand lever 128, in the manner heretofore described.

*Various cycles of movement obtained by setting the adjustable dogs.*

Various cycles of movement may be obtained by setting the dogs to various positions on the table, some of which movements, for example, are as follows:—

A continuous slow movement of the reciprocatory slide back and forth may be obtained by engaging clutch 20 and operating clutch 43 by the dogs 139 and 140;

A continuous fast movement back and forth of the reciprocatory slide may be obtained by engaging clutch 15 and operating clutch 43 by the dogs 139 and 140;

A slow feed across the work may be obtained by engaging clutch 20, affecting a reverse by either dog 139 or 140, and feeding back slowly to the starting position so as to refinish the work, and then stopping the slow drive by dog 127, disengaging clutch 20 (Figs. 5 and 6); or Clutch 15 may be manually engaged (in the manner hereinafter to be described), starting the fast drive, the work approaching the cutter quickly, then stopping the fast drive by the dog 124 (Fig. 5), disengaging the clutch 15, through the medium of the plunger 126, pinion 108, throw rod 111, and levers 112 and 114, then starting the slow movement by manually engaging clutch 20 by lever 93 (Fig. 5), so as to take a cut across the work, then speed up again by dog 123 moving clutch 15 to engaging position by means of the engagement of dog 123 with plunger 125 and the various co-operating parts (Fig. 5), to provide a fast traverse to move the next work-piece upon the table to the cutter, then slow down again for cutting by disengaging the clutch 15 by a dog 124 in the manner heretofore described, and so on, and repeating the operation of clutch 15 by dogs 123 and 124 as often as desired, until all of the work-pieces have passed the cutter, and then effecting a reverse of the slide by either dog 139 or 140 (Figs. 1 and 9), and repeating the intermittent movement on the backward stroke by dogs 141 and 142 (Fig. 9) mounted on the slide 60 and identical in structure and function with the dogs 123 and 124, so as to refinish the work at a slow rate of speed and traversing quickly to bring the work-pieces successively beneath the cutter; or The slide may be returned completely to initial position without the interruption and finally stopped at the starting position by dog 124 (Fig. 5) disengaging the clutch 15, and dog 127 disengaging the clutch 20.

The work may now be removed and new work set and the cycle may be repeated.

Or the movement of the slide may be stopped after the cut has been taken at the end of the slow forward stroke, by dog 127 (Figs. 1, 5 and 6), then the work may be removed so as not to mar it on the backward stroke, and after its removal the fast movement of the slide may be started by manually operating clutch 15. The direction of movement, still forward, will immediately be reversed by either dog 139 or 140 (Figs. 1 and 7), the fast return movement to be finally stopped by dog 124 disengaging clutch 15 (Fig. 5). New work may now be set and the cycle repeated.

Dogs 123 and 124, 141 and 142 (as shown in Figs. 1 and 9) are provided with pivoted latches 143 so that they do not interfere on the respective return strokes of the slide with the clutch-operating plungers 125 and 126.

From the foregoing it will be seen that almost any desired movement may be derived with respect to changing from a slow to a fast movement at either the forward or return stroke of the slide.

Since the same slow or fast movement in either direction may also be transmitted to the rotatable work-table mounted upon the slide, it follows that by a like arrangement of adjustable dogs upon the work-table, a like variety of slow and fast movements may be transmitted to the table in either direction of rotation of the same for circular milling.

*Combination of straight milling with an indexing movement of the table.*

The above-described method of straight milling by reciprocation of the slide, while highly efficient, is preferably employed however only where the pieces to be milled are of such size or weight, or otherwise of a nature, that the placing of work-pieces on the table is either limited to one or, where a plurality of work-pieces is placed on the table, permits only of setting in one row to the exclusion of other work-pieces, or where the pieces to be milled are very few and held on the work-table by a single work-holding fixture. In all other cases I preferably fasten the pieces to the circular table 61 to one side of the center of the table, and while cutting is being done upon these, work will be fastened to the table symmetrically on the opposite side of the center of the table, so as to be positioned in a path beneath the cutters when the table is indexed the required number of divisions, in the manner already outlined. It is obvious that this method of milling saves considerable time as the setting of new work and the removing of the finished work is being done while the cutter is working upon other work being fed beneath the cutter. All the different movements of the slide mentioned before, that is, slow, fast, and intermittently slow and fast, both in advance and reverse, with their variations, may, of course, be employed, with the addition that at the end of the return stroke, the indexing movement of the table 61 takes place.

The table is normally power-driven but may be manually driven in a manner later to be described. The power driving mechanism may be engaged in operation manually by the operation of the hand lever 144 (Figs. 1, 20, 21 and 22) in a manner also later to be described, or automatically by the engagement of the power drive by the action of an adjustable dog 145 (Figs. 4, 17 and 31) through the movement of the slide.

*Drive for indexing movement of the work-table.*

The power drive for the indexing movement of the work-table is taken off the main feed shaft 5 and transmitted over clutch 154 (Figs. 5 and 26), worm 146, which is loose on shaft 5 (Fig. 3) and which may be engaged with clutch 154 as shown in Fig. 5, worm-wheel 147 (Figs. 5 and 27) and the intermediate shafts and gears 148, 149, 150, 151 and 152 (Figs. 3, 26 and 27) to the spur gear 153, which is loose on shaft 86. Clutch 154 (Figs. 5 and 26), which turns with and slides on shaft 5, may be brought in mesh with the clutch teeth on worm 146 by means of the clutch shoe 155 (Fig. 5) and the shifter rod 156, whenever the motion of the indexing drive parts is desired, and may be kept disengaged at other times. Spur gear 153 (Figs. 3 and 27) is provided with clutch teeth 157, with which the clutch 90 of the teeth 158 can be brought into mesh, and thus the motion from the gear 153 be transmitted to the shaft 86, from which in turn movement is taken over the gears 84 and 83 (Figs. 3, 27 and 28) to the shaft 82.

It should be recalled that shaft 86, gears 84 and 83 and shaft 82 are also used for the transmission of motion for the circular drive of the table 61 when the latter is used for the continuous circular milling, the movement then being derived by engaging the clutch teeth 89 (Fig. 27) of clutch 158 to the clutch teeth 91 of spur gear 92, to receive the benefit of the speed changes as derived from the shaft 53, in the manner heretofore stated. It should also be observed that the rotation of shaft 86 and shaft 82 as derived from the spur gear 153 is a constant one, as the indexing movement of the table should, for practical reasons, be a constant one.

A view of the driving mechanisms, particularly as shown in plan in Fig. 26, will make clear the lines of transmission of the drives from main driving shaft 5 to the reciprocatory slide and the rotatable work-table thereon. A slow driving movement is transmitted from shaft 5 to shaft 53 from the right-hand end of shaft 5, as viewed in Fig. 26, through the worm 16, worm-wheel 17, clutch 20, gears 21, 22, 24, 25, 26 and 27, shaft 28, the differential mechanism in frame 49, shaft 38, and the reversing mechanism 39, 40 and 43 to the shaft 53, while a fast movement is transmitted from the left-hand portion of shaft 5, as viewed in Fig. 26, directly through clutch 15, gears 13, 29, 30, 32, 33, 34 and 35, shaft 36, and the reversing mechanism to shaft 53, and the constant speed indexing movement is taken from an intermediate portion of shaft 5, as viewed in Fig. 26, through the worm 146, clutch 154 and gear 147 (Fig. 27). The two speed movements referred to as transmitted through shaft 53, is then transmitted to the slide and the work-table through the shafts 63 and 86, respectively, and the co-operating clutches and gears shown at the left-hand end of these shafts, as viewed in Fig. 27, while the constant speed movement referred to is taken from shaft 5 to shaft 86 through worm 146, gear 147, shaft 148, gears 149 and 150, shaft 151, gear 152, and gear 153.

Continuing with the detailed description of the indexing drive, fixed to shaft 82 is a bevelled gear 159 in mesh with bevelled gear 160 on shaft 161 (Figs. 3, 15, 27 and 28). Shaft 161 is journalled in bracket 162, which bracket is fastened to the slide 60, as shown particularly in Fig. 3. Indexing drive pinion 163, turning with and sliding on shaft 161, is provided with clutch teeth 164, which may be brought into mesh with clutch teeth 165 of the pilot gear 166, which is mounted loose on shaft 161, but in mesh with the internal gear 167. The latter is secured to the circular table support 72, which in turn carries the work-table 61 (Figs. 3, 15, 16, 17 and 18). By this arrangement of parts, whenever the clutch teeth of the gears 163 and 166 are brought into mesh, the indexing motion is transmitted to the table.

*Means for locking the work-table against rotary movement upon the slide and for releasing the same for such movement.*

As stated before, it is to be understood that when the reciprocatory slide is being driven in straight-line milling, the rotatable work-table is locked to the slide against rotation, and to rotate the table either for circular milling or for partial rotation for indexing, the table must be unlocked from the slide. Moreover, after indexing a certain division or the required number of divisions, the indexing drive must be stopped and the table again locked to the slide.

Assuming the slide 60 in movement, and the engagement of the indexing drive actuated as heretofore stated by the clutch rod 156 engaging the clutch 155 with the worm 146 (Fig. 5), the table lock pin 168 (Figs. 4, 17 and 31) is withdrawn by the downward movement of the lock pin operating lever 169 (Fig. 17) caused by engagement therewith of the dog 145, which is adjustable upon the frame of the machine adjacent the slide 60. This lever 169 is fulcrumed at 170 and connected by link 171 to the lever 172, which while travelling along with the slide 60, encounters on its path the inclined face 175 (Fig. 17) of the dog 145, along which inclined face the roll 174 travels downwardly, thus withdrawing the table lock pin against the pressure of its spring 188.

Lever 169 has an upwardly-extending arm 169' (Figs. 16 and 17) in mesh with a pinion 177 (Fig. 20), on shaft 178, which shaft also carries the pinion 179, which is in mesh with the rack 176 (Figs. 16, 17 and 20), and whereby upward and downward movement is transmitted to the rack 176 from the lever 169. The rack 176 is designed to cause the engagement of the index drive pinion 163 with the pilot gear 166.

Figures 15, 19:
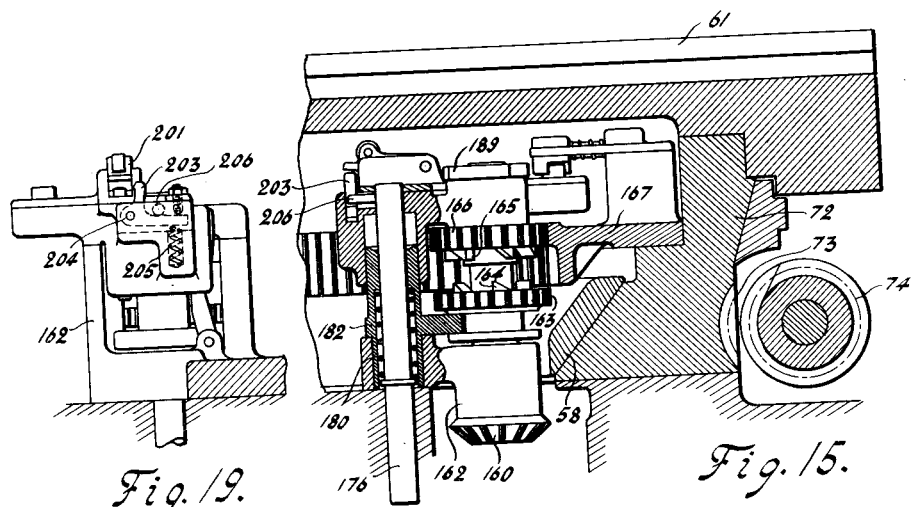
Fig. 15 is a sectional view along the line 15—15 of Fig. 14, showing the indexing mechanism in operative position.
Fig. 19 is an end view of the indexing mechanism in the direction of the arrow N 110 of Fig. 14.
Figure 16:
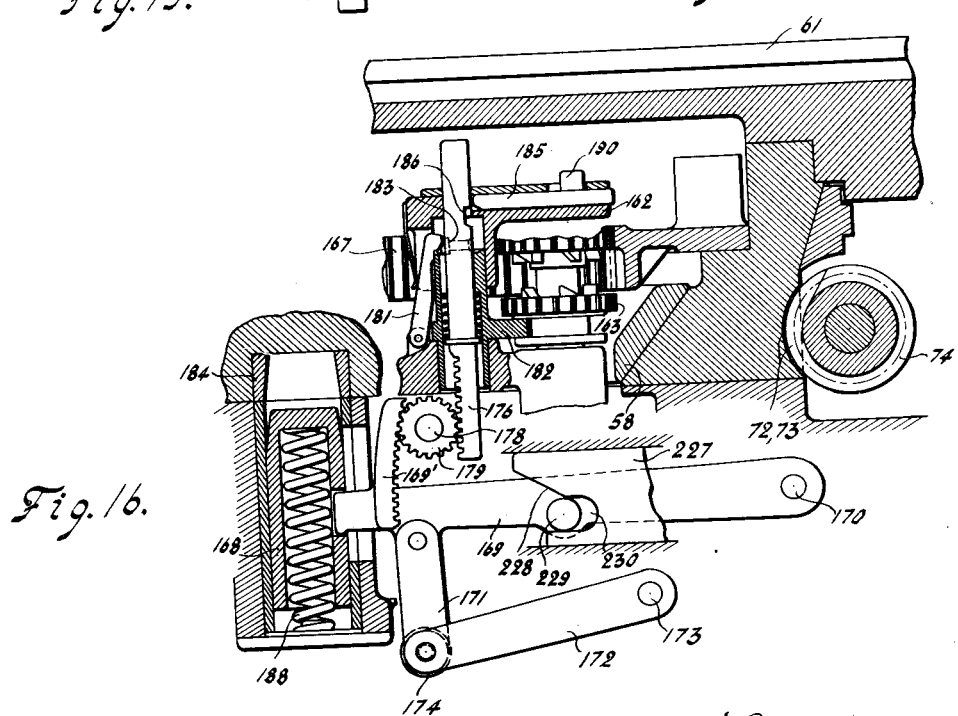
Fig. 16 is a sectional view along the line 16—16 of Fig. 14 showing the indexing mechanism in one position of operation.

The upper portion of the rack 176 above the teeth thereon is cylindrical, as shown in Figs. 16 and 17, and this upper portion is surrounded by the tubular part of a forked member 182, the fork of which extends in a grooved portion of the gear pinion 163, as shown in Figs. 15 and 16. The tubular portion of the forked member in its upper part presents a close sliding fit about the tubular portion of the rack 176 and its lower part is recessed for the reception of a spring 180 which abuts below upon a collar on the tubular portion of the rack 176 and above against that portion of the tubular part of the forked member which has a sliding fit upon the rack 176, all as shown particularly in Fig. 15.

The forked member is normally held in its lowermost position and with the gear pinion 163 in its lowermost position out of engagement with the pilot gear 166, as shown in Figs. 15 and 16, by a spring-pressed latch 181, whose nose extends through a vertical slot in the tubular bearing of the forked member to hold that forked member in its lowermost position, as shown in Fig. 16.

The upward movement of the rack 176, while compressing the spring 180, continues to a point where it releases, by means of a pin 183 extending through the upper cylindrical portion of the rack, the spring-pressed latch 181, as shown in Fig. 17, and which latch until thus released has held the fork 182 in its lowermost position, as shown in Fig. 16. As soon as this fork is thus released, the energy of the compressed spring 180 throws the fork with the index drive pinion 163 upwardly, bringing the clutch teeth of the index drive pinion into mesh with the clutch teeth of the pilot gear 166.

The internal gear of the rotatable worktable is a wide-faced gear, having a width of face equal to the face of the pilot gear, plus the face of the drive pinion, plus the depth of the clutch teeth of both of these elements.

Upon the face of the internal gear at equally-spaced distances corresponding to the number of degrees for indexing, are cut-out portions, as shown in Fig. 18, the number of cut-out portions corresponding to the number of divisions of the indexing movements to be given to the rotatable table. The width of the cut-out portion, measuring across the face of the gear, is such as to always leave above the smooth portion a sufficient width of gear teeth to engage the pilot gear, as shown in Fig. 18, and the drive pinion is designed to be moved upwardly into initial engagement and downwardly away from such engagement with the pilot gear only across a cut-out portion of the internal gear.

Bringing the clutch teeth of the drive pinion into mesh with the clutch teeth of the pilot gears starts the indexing movement of the table, the initial rotation being transmitted to the table from the drive pinion through the pilot gear, since that gear is the only one in mesh with the teeth of the internal gear of the table across a cut-out portion, and until the full-faced teeth of the internal gear are reached by the drive pinion. After the full-faced toothed portion of the internal gear is reached, it is necessary to separate the drive pinion from the pilot gear, as otherwise when the next cut-out portion of the internal gear of the rotatable table is reached, that table would continue to be rotated through the intermeshing of the pilot gear and the drive pinion, instead of coming to a stop as is desired and is designed by the cut-out portion. When, therefore, after the initial rotation through the pilot gear has started, and the drive pinion separated from the pilot gear, the drive pinion continues along the full-faced toothed portion of the internal gear to rotate the table until a cut-out portion is again reached when the drive pinion becomes inoperative. It is obvious that this driving position of the driving pinion, separated from the pilot gear, is an intermediate position of the drive pinion, that is, not its lowermost position, as shown in Figs. 15 and 16, for the lowermost position of the drive pinion is one entirely below the internal gear. This intermediate position of the driving pinion, in operative position to drive the rotatable table, and yet not in engagement with the pilot gear, is shown in Fig. 18. We have, therefore, three positions of the drive pinion and the internal gear; the first being the lowermost position of the drive pinion before the indexing drive is begun at all, as shown in Figs. 15 and 16, the second being the highermost position of the drive pinion in engagement with the pilot gear to start the rotation of the table, as shown in Fig. 17, and the third being the intermediate position of the drive pinion to directly drive the table until a cut-out portion of the internal gear is reached, as shown in Fig. 18.

The driving pinion, being in the intermediate position last referred to and directly driving the work table in rotative movement, will run out of mesh upon a cut-out portion of the internal gear of that table, and the table will stop, and in which position the table lock pin 168 will be just opposite a lock pin bushing 184 in the table, there being as many lock pin bushings in the table as cut-out portions on the internal gear of the table and similarly distributed.

During the indexing movement of the table the lock pin must be held down in unlocking position, and should be released for upward movement into locking position as soon as the table movement is stopped.

Figure 14:
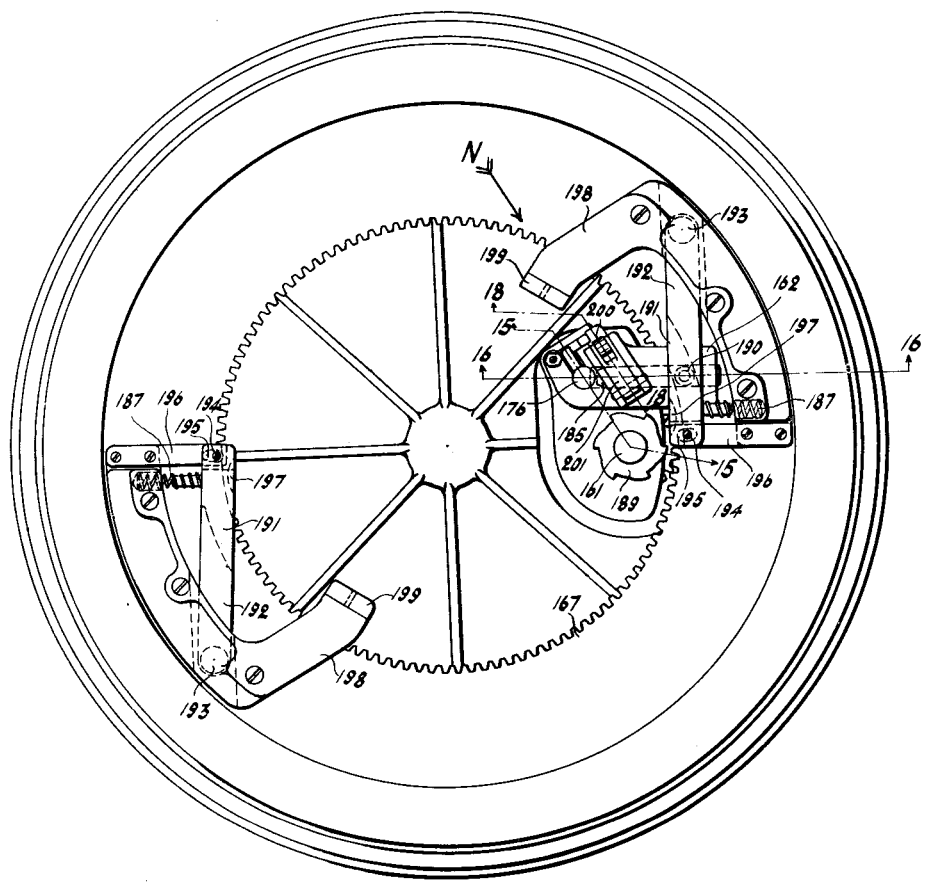
Fig. 14 is a plan view of the indexing mechanism of the work-table.

This is accomplished in the following manner: When through the downward movement of the lock pin the rack 176 moves up to its highest position, plunger 185, mounted for axial sliding movement in bracket 162 and impelled forward or toward the left (as shown in Fig. 14) by spring 187, enters a notch 186 (Fig. 17) in the rack 176, thus locking the rack in its highest position and the lock pin 168 in its lowest position.

It must be borne in mind that the lock pin spring 188 (Fig. 17) is in a compressed state in the lowermost position of the lock pin, and is held in this state as long as the roll 174 is held in its lowest position by the dog 145. However, slide 60, during the process of indexing the rotatable table, keeps on travelling (when the indexing and return movements of the reciprocatory slide are performed simultaneously), and the travel will continue for a distance sufficient to bring the shaft away from the dog 145, and to permit the shaft to move up with the lock pin after the indexing has been performed. After this, the motion of the slide can be stopped at any desired point. While the shaft is moving away from the dog, however, the lock pin 168 would be moved up again prematurely by the spring 188, if not otherwise held down during the continuation of the indexing. As before stated, however, the rack 176 and lock pin 168 are held down by the plunger 185 engaging the notch 186 in the rack.

As soon as the index drive pinion runs out of mesh with the internal gear, that is, the drive pinion runs upon a cut-out portion of the face of the internal gear, and when the lock pin 168 is just opposite a bushing 184, plunger 185 must be withdrawn to release the rack 176 and the lock pin 168, and this is automatically accomplished by the cam 189 (Figs. 14 and 18), which is mounted to the continuously rotating shaft 161.

The action of this cam in releasing the lock pin is as follows: Plunger 185, which is free to slide in the bracket 162, is provided with the stud 190 (Figs. 14 and 17), which stud enters the arcuate formed groove 191 of the arm 192 (Fig. 14). This arm is fulcrumed at one end at 193 to the rotatable table support bearing the internal gear, as shown in Fig. 14, and hence is carried around in a circular path in the rotation of the table.

Spring 187, as shown in Fig. 14, impels the arm 192 toward the center of the internal gear, the movement being limited by screw 194 in the arm 192 and the slot 195 in the arm support 196.

Assuming now the lock pin 168 in a position locking the table, that is, in its uppermost position in bushing 184 (Figs. 4 and 31) and, therefore, the rack 176 down and plunger 185 pressed against the cylindrical portion of the rack above the notch 186, and the stud 190 on the plunger 185 in the arcuate slot 191 of the arm 192 (Fig. 14), the free end of arm 192 will just be in a position to clear the outside diameter of the rotating cam 189, as shown in Fig. 14. As soon as the table lock pin is withdrawn in the manner heretofore stated, and the indexing drive engaged, the rack at the time having moved upwardly, spring 187 will throw arm 192 and plunger 185 forwardly, or to the left, as viewed in Fig. 14; the plunger will enter the notch 186, as shown in Fig. 17, the table lock pin will be held in the down or unlocking position, and the free end of arm 192 will enter the toothed space of the cam, as shown in Fig. 14. The indexing movement having begun, the cam 189 and arm 192 are both travelling at the same circumferential speed, with the arm moving away from the cam and the arcuate groove 191 retreating from the stud 190.

Arm 192 is cut out at 197 (Fig. 14) so as not to interfere with the tooth of the cam.

There may be as many arms 192 mounted upon the internal gear 167 as is desired to make indexing divisions, and it is obvious that when the next arm comes around, stud 190 will enter the groove 191 and arm 192 enter the toothed space of cam 189; and after coming to a stop, that is, when the index drive pinion runs out of mesh with the internal gear, the tooth of the revolving cam 189 will push the free end of arm 192 back, that is, toward the right in Fig. 14, and the stud 190, being in the slot 191, is carried back, that is, toward the right as viewed in Fig. 14, taking along the plunger 185, and thus releasing the plunger from the notch 186 in rack 176 (Fig. 17), and thus releasing the rack for downward movement, and the lock pin 168, which through the energy of the compressed spring, will be thrown upwardly into bushing 184 and lock the table.

As has been before stated, after the pilot gear 166 has guided the drive pinion into mesh with the internal gear 167, by the clutch teeth 164 of the index drive pinion being brought into mesh with the clutch teeth 165 of the pilot gear 166, so as to start the indexing movement of the table, the clutch teeth should be separated, that is, the drive pinion should be pushed downwardly to its intermediate position so that it alone will do the driving of the table and the table will come to a stop whenever this drive pinion runs out of mesh with the internal gear at one of the cut-out places on the face of that gear. This separation of the drive pinion from the pilot gear and the maintaining of the drive pinion in intermediate driving position is accomplished by the following mechanism: To the same bracket 162 in the slide 60 in which is journalled the shaft of the driving and pilot gears, is pivoted at the top, as shown in Fig. 18, a finger 201, designed in its position as shown in Fig. 18 to press downwardly upon a plunger 202 normally impelled upwardly by spring 207, the lower end of which plunger bears upon the forked member 182 already referred to. Finger 201 bears a shaft 200 designed to be engaged by a double dog 199 upon the extremity of an arm 198 attached to the ring support 72 of the internal gear 167, as shown in Fig. 14, when that dog is moved in a circular path by the rotation of the table over the shaft 200 of the finger 201.

Assuming now that the pilot gear has just guided the index drive gear into full mesh with the internal gear 167, the arm 198 with the bevelled dog 199 thereon (Figs. 14 and 18) is travelling along with the internal gear, and approaches the shaft 200 of the finger 201, and presses it down, thus also pressing down the spring-pressed plunger 202 and the fork 182, which carries down the drive pinion 163 to its intermediate position separating its clutch teeth from the clutch teeth of the pilot gear and yet maintains the drive pinion in engagement with the lower portion of the teeth of the internal gear, all as shown in Fig. 18.

It is essential to hold driving pinion 163 in this intermediate position by means of the finger 201 in the position shown in Fig. 18, during the entire time of the indexing movement, as otherwise spring 180 surrounding the rack 176, which is still under partial compression, would throw the clutch teeth of the index drive pinion back into mesh again with the clutch teeth of the pilot gear, as soon as the dog 199 had passed the shaft 200, thus permitting the finger 201 to pivot upwardly and release the plunger 202 and the fork 182 for upward movement, which re-engagement of the driving pinion with the pilot gear would prevent the stopping of the table at the completion of the indexing movement.

Finger 201 is thus held down after the dog 199 has passed the shaft 200 (Fig. 18) by the latch 203 (Fig. 19) which is pivoted at 204 to bracket 162 and which snaps over the end of the finger by the pressure of the spring 205.

It is equally essential that after the drive pinion has been held down in its intermediate but driving position with the work-table during the indexing movement, as shown in Fig. 18, and as soon as the drive pinion runs into a cut-out portion of the internal gear so that the indexing movement comes to a stop, all the parts be restored to their initial position for the beginning of another indexing movement when desired. It is further to be observed that for the beginning of another indexing movement, the drive pinion must again come into complete engagement with the pilot gear, which engagement is impossible if the finger 201 be not released from the position, as shown in Fig. 18, in which it was maintained during the last indexing. In restoring the parts to their original position for the beginning of another indexing movement, means must therefore be provided for releasing the finger 201 and thereby releasing the plunger 202 from the position shown in Fig. 18, so that the fork 182 can carry the drive pinion 163 upward into complete engagement with the pilot gear 166.

This release of the finger 201 is accomplished by a pin 206 mounted in the end of the rack 176 (Fig. 15 and Fig. 19), which pin upon the downward movement of the rack 176 in the restoration of the parts to their initial position, trips the latch 203 (Fig. 19) away from holding position upon the finger 201, thus permitting the finger 201 to pivot upwardly under the impulse of the spring-pressed plunger 202, the finger 201 remaining in the upward position until upon the next indexing movement the dog 199 comes into engagement with the shaft 200 on the finger 201, as shown in Fig. 18. Therefore, at the end of the indexing movement, when by the action of the cam 189 (Fig. 14) plunger 185 releases the rack 176 in the manner heretofore stated, and the rack moves downwardly and the lock pin 168 correspondingly upwardly to lock the table, the spring 180 surrounding the rack is released from pressure (Fig. 16), thus permitting the fork 182 to move downwardly, carrying the drive pinion 163 to its lowermost position, and in this downward movement of the rack 176, the pin 206 trips the latch 203 from the finger 201, the finger being impelled forwardly by the spring-pressed plunger 202, and all the parts are restored to their initial position, and ready for the next indexing movement.

*Manual engagement of the index drive.*

In the heretofore-described movement of the index drive, it is to be recalled that that drive is set in operation automatically by the dog 145 coming in contact with the shaft 174 on the depending members of the lever 169 (Fig. 17). The index drive may also be engaged manually by the operation of the hand lever 144 (Figs. 20, 21 and 22), by connecting the hand-lever shaft 208 to the shaft 178 through the medium of a toothed clutch coupling, one-half 214 (Fig. 22) of which is fixed to the shaft 178, and the other half, 215, of which is fixed to the shaft 208. Hand lever 144 is fulcrumed at 209 (Fig. 20) in the bushing 210 (Fig. 22), which bushing has its bearing in the bracket 211, the latter being fastened to the slide 60. The end of lever 144 is also connected to the shaft 208 by pin 212 (Figs. 20 and 22). The shaft 208 is splined and has a sliding bearing in the bushing 210 and is caused to turn with the bearing through the connection with the key 213 (Fig. 22). Normally, clutch coupling 214, 215, is held disengaged by the spring 216, and the hand lever 144 is not affected in any way when engaging the index drive automatically through the movement of the slide and the dog 145 as heretofore described.

When engaging the index driving mechanism by hand, hand lever 144, resting against pin 217 (Fig. 21) is first pulled out, so that the lever pivots upon its fulcrum 209 (Fig. 20), which pivoting moves the shaft 208 with the clutch 215 into engagement with the clutch 214. In this position, latch 218 (Figs. 20, 22 and 25) is impelled by pressure of the spring 219 to enter the annular groove 220 in the shaft 208, thus locking the shaft with the clutch parts 214 and 215 in engagement, against the pressure of the spring 216. Lever 144 is now swung over to contact the pin 221 (Fig. 21), which movement turns the shaft 208 and with it the shaft 178, thus rotating the pinion 179 and impelling the arm 169' of the lever 169 and the lock pin 168 downwardly, the lock pin being withdrawn from locking position with the table. This same movement of shaft 178 and the pinion 179 thereon impels the rack 176 upwardly until the latter is locked by the plunger 185 (Fig. 17), all in the manner as when operated automatically by the dog 145 through the movement of the slide.

At the moment of locking, the latch 218 (Fig. 25), which is hinged in bushing 210 and which, therefore, turns with the shaft, has approached the stationary stop screw 222 in the bracket 211, and is pushed out of the groove by engagement with said stop screw. The shaft 208 being, therefore, released from its locking position, is impelled by spring 216 outwardly or to the left, as viewed in Fig. 22, thus moving clutch 215 out of engagement with clutch 214, so that when the indexing movement stops and the table lock pin is impelled upwardly into locking position by its spring 188 (Figs. 16 and 17), no motion is transmitted to the hand lever, and thereby danger to the operator is avoided.

*Complementary locking of the indexing and circular table driving mechanisms.*

In either milling operation, continuously circular, or straight milling with the indexing movement of the table, heretofore referred to, it is necessary to operate the table lock pin. It is, therefore, essential to unlock the mechanism in such a way that when the table lock pin is operated in connection with the continuous circular milling, it should lock the mechanism for the operation of the indexing drive, and vice versa.

It should be borne in mind that the indexing movement of the table is a constant one, and the movement for continuous milling a variable one. and the unlocking of the mechanisms should permit the engagement of either one or the other movement, but not both simultaneously, thus rendering the machine operative and safe independently of the carefulness of the operator.

Assuming the table lock pin in position locking the table and the table drive worm 74 (Figs. 16, 17 and 29) out of mesh with the worm-wheel 72, 73, to now set the machine for circular milling, the lock pin must first be withdrawn, and as soon as it is clear of the table, the worm should be moved into mesh with the worm-wheel in the position shown in Fig. 29. This is done in the following manner:—

Figure 31:
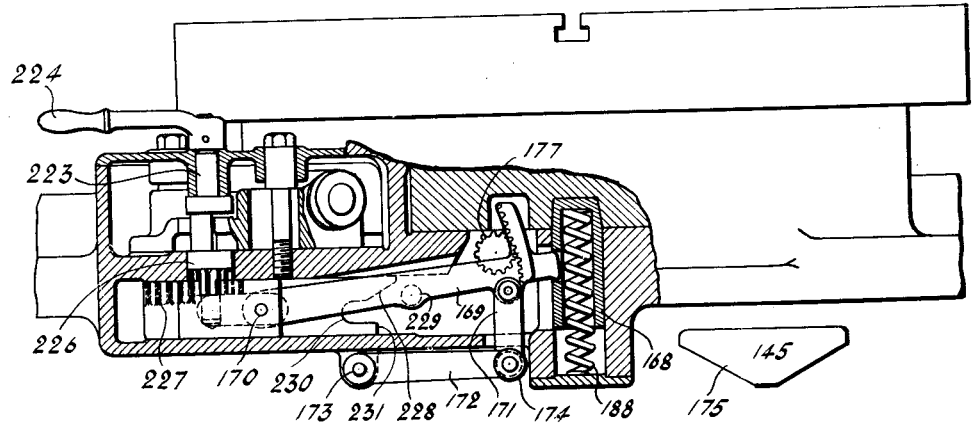
Fig. 31 is a view partially in section and partially in elevation of the mechanism to lock the table to the reciprocating slide and of the hand and power operating indexing mechanism.

Bracket 76 with the worm-wheel 74 is fulcrumed at 79, as already stated, and the worm is brought into mesh with the worm-wheel by turning the eccentric shaft 223 by means of the hand lever 224 (Figs. 1, 29 and 31), the eccentric entering the slot 225 in the bracket 76 (Fig. 29). Shaft 223 is provided on a portion extending beyond the slot 225 (as shown to the left thereof in Fig. 31), with gear teeth 226, which are in mesh with the rack 227 (Figs. 20 and 31). Turning the eccentric shaft 223 moves the rack forward, the bevelled end 228 (Fig. 16) of the rack encountering on its path the stud 229 on the lever 169, pressing the latter down, and with it the locking pin, thus setting the table free for the circular driving movement. But, after pressing the lock pin down just sufficiently to clear the table, stud 229 is in position to enter the notch 230 of the rack 227, and the notch 230 moves further over the stud (to the left, as viewed in Fig. 16) by the further turning of the eccentric shaft 223 to bring the worm 74 into mesh with the teeth 73 of the external gear of the table (Fig. 29).

While the lock pin is moved down by the foregoing operation, rack 176 of necessity moves upward, but because of the restraint of further movement of lever 169 by reason of the stud 229 thereon entering the notch 230 of rack 227, the rack 176 is not moved so far upwardly as to release the fork 182 (Fig. 16) for the engagement of the indexing drive, the movement of rack 176 having stopped before the pin 183 reaches the latch 181. Stud 229, now in notch 230, prevents any further movement of the lever 169, and renders the accidental engagement of the index drive impossible. Consequently, to engage the index drive, stud 229 must be out of the notch 230, which also means the worm out of mesh with the wheel (Fig. 29), and only after this has been done can the lock pin be moved further down and the rack be moved further up, to cause pin 183 (Fig. 16) to push the latch outwardly and release the fork 182 for the engagement of the index drive.

From the foregoing it is obvious that when the worm 74 (Fig. 29) is operated to engage the gear teeth 73 for the circular milling, the lock pin is unlocked from the table to set the table free for rotation in circular milling, but the index gear 163 is locked from moving upwardly into engagement with the internal gear 167, and the indexing movement of the table is prevented.

On the other hand, when the handle 224 and the worm 74 (Figs. 29 and 31) are in the "out" position, and hence the circular milling drive disengaged, and when the indexing drive is engaged by engagement of the drive pinion 163 with the pilot gear 166, as shown in Fig. 17, stud 229 is in the path of the end 231 (Fig. 17) of the rack 227, and an attempt to throw the worm into mesh with the wheel in the position shown in Fig. 29 for circular milling while the index drive is on, would be stopped by the stud 229 abutting against the end 231 of the rack 227 (Fig. 17).

It is obvious from this description that complementary locking mechanisms are provided whereby, when the table is unlocked from stationary engagement with the slide so as to be free to rotate thereon, an engagement of the drive which rotates the table continuously in circular milling locks in inoperative position the drive for partially rotating the table for indexing, and vice versa.

*Manual engagement of the fast drive.*

As already stated, the fast drive for the reciprocatory movement of the slide 60 and the rotative movement of the work-table 61 in milling or advancing the work-pieces successively to operative position with the cutter or for returning the reciprocatory slide, is taken from the shaft 5 and transmitted through the shaft 53 (Fig. 26) through the clutch 15 and the gear 13 upon the shaft 5, and the line of gears heretofore described which transmit the rotation to the shaft 53. As also heretofore described, the clutch 15, which thus transmits this fast drive, may be automatically thrown into operation either by dogs, such as the dogs 100 and 101 upon the work-table (if that is in rotation) engaging plungers 102 or 103, whereby a clutch shifting throw is transmitted to the rod 111 (Fig. 5), or by dogs upon the slide (if that is being reciprocated), such as dogs 123, 124 similarly operating upon clutch throw rod 111 through plungers 125, 126. It is desirable, however, to also provide a manual operation of the clutch 15, and this is done by a manual operation of one of the plungers, used in the automatic operation, such as plunger 126 (Fig. 5). As shown in Fig. 8, which is a section on the line 8—8 of Fig. 5, the plunger rod 126 is provided upon a side opposite to that engaging the pinion 108, with rack teeth which are in engagement with a pinion upon a shaft 249, the shaft 249 being provided with a handle 250 (Fig. 1) to permit of its manual rotation. It is obvious that when the shaft 249 is rotated by the handle 250, the plunger 126 is operated, and through the intermeshing lever pinion 108, the clutch throw rod 111 may be operated to either engage or disengage the clutch 15 (Fig. 5).

*Combined straight milling and indexing on return.*

As will be understood from the foregoing description of the indexing movement in connection with the movement of the slide 60, a great variety of movements can be derived by setting the different dogs to suit almost any condition and to perform the work in a most economical manner. However, work of a nature which permits the cutters to pass over the work-piece entirely, is handled still more economically by performing the indexing movement during the return stroke of the slide.

In this combination of straight milling by the reciprocatory movement of the slide and indexing movement of the table upon the slide, the slow and fast drives are first manually engaged by the hand lever 93 (Figs. 5 and 6) and the hand lever 250 upon the pinion shaft 249 (Figs. 1, 7 and 8), respectively, in the manner heretofore stated. As also already stated, when both the slow and the fast drives are in engagement, because of the differential transmission mechanism shown in plan in Fig. 26, the fast drive is the one effectively transmitted to the shaft 53, and from thence through the shaft 63 (Fig. 27) to drive the slide, and the speed of drive is dropped from high to low by the disengagement of the high speed drive automatically by dogs in the manner heretofore referred to, thus leaving the remaining movement transmitted through the differential mechanism to the shaft 53 that of the slow drive which is similarly transmitted through the shaft 63 to drive the slide at slow speed. Assuming, therefore, that both the slow and fast drives have been engaged by manual operation of the levers 93 and 250, as heretofore stated, the work upon the slide is approaching the cutter rapidly, then the fast drive is automatically disengaged and the movement is slowed down for cutting. After the work has passed through the cutting position, the fast drive is again automatically engaged and the table is speeded up again for traverse, until the next advancing work-piece has advanced to cutting relation with the cutter, then the fast speed is automatically disengaged, and the slide slowed down for the cutting operation, and this succession of drives is continued until all of the successive work-pieces have passed through the cutting position.

Figure 32:
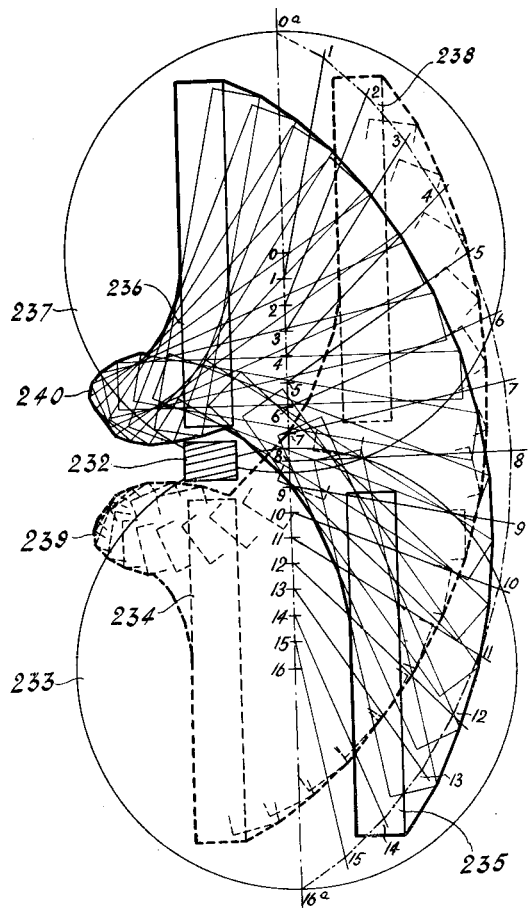
Figs. 32, 33 and 34 are diagrammatic views showing the travel of the work upon the work-table around the cutter through the simultaneous movement of the reciprocating slide and the work-table in indexing.

During this period of rapid traverses and slow drives for cutting, work has been fastened to the table on the opposite side of its axis, as shown in the diagram Fig. 32, where the numeral 234 represents either a long piece of work or a series of short pieces of work to be passed through the cutter while the numeral 235 represents a corresponding work-piece or plurality of work-pieces upon the table upon the opposite side of its axis.

After the completion of the cutting operation upon the last work-piece, instead of returning the slide and then indexing the table, the table may be speeded up forwardly for a short distance sufficiently to have the last piece of work completely clear the cutter, and then the indexing drive may be engaged by the dog 145 (Fig. 17) in the manner heretofore described, and the return drive for the slide may be engaged by dog 139 (Figs. 1 and 9) in the manner heretofore described, thus causing the return of the slide and the indexing of the table thereon simultaneously.

The indexing movement being, for practical purposes, a constant one, is, of course, performed during a certain length of time, and during which time, approximately, the return of the slide should be accomplished. As the length of the return stroke of the slide varies with the length of work to be milled, it follows that the speed of the return movement should be a variable one, for which provision is made by the change gears 32, 33, 34 and 35 (Fig. 26).

The effect of returning and indexing simultaneously is clearly shown in the diagrams (Figs. 32, 33 and 34), and, as there shown, the work-pieces are, without interference, turned around the cutter.

In the diagram, Fig. 32, 232 represents the cutter, 233 the circular table in the initial position, 235 the work-piece being set, while the cutter is working on 234, 237 the position of the circular table at the end of the feeding movement, 236 the position of the finished work-piece 234, 238 the position of the unfinished work-piece 235 at the end of the feeding movement.

Numerals 16 to 0 indicate the travel of the center of the table on the forward stroke at a feeding rate of speed, that is, at the slow speed, and numerals 0 to 16 the return stroke at a fast rate of speed. The curved line 0ª to 16ª indicates the path of travel of the point 0ª when the table is indexing 180 degrees.

Considering now the performance of the indexing and the return movements in approximately the same length of time, and starting both movements simultaneously at the end of the forward feed movement, point 0 will reach point 16, which is the starting position, when point 0ª reaches the point 16ª, and the unfinished work-piece 238 will take the position of the work-piece 234, covering in its travel the area indicated by the dotted line 239, and the finished work-piece 236 will take the position 235, covering in its travel the area indicated by the heavy line 240. It is particularly to be noted that the diagram shows the work-pieces kept at all times clear of the cutter in this indexing and return movement.

Figure 33:
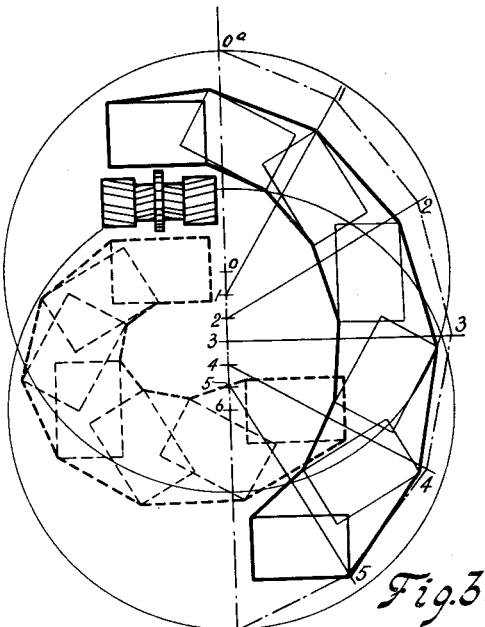

Diagram, Fig. 33, shows a slight variation of the arrangement shown in diagram, Fig. 32, the difference being in the different location of the work-piece on the table, the work-piece being shown as a shorter one than in diagram, Fig. 32. The forward feed and the return fast movement are correspondingly shorter, from 6 to 0 and from 0 to 6, respectively. The speed of the return movement, however, will here be slower in order to give time for the indexing movement during that return, as the indexing movement is constant. To keep the rate of speed for the return movement constant and vary the speed for the indexing movement would not be practical, as then the indexing movement, for, for example, 180 degrees, would reach an excessive rate of speed to perform it in the short time required for short return movement. In Fig. 33, as in Fig. 32, during the return and indexing movements, the work-pieces, both finished and rough, are kept clear from the cutter.

Figure 34:
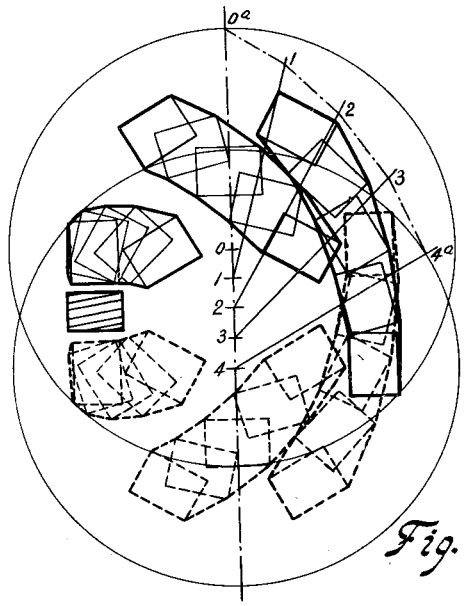

Diagram, Fig. 34, shows the method of use of the machine when a still greater number of work-pieces are distributed upon the table in a circular path, requiring a separate indexing movement to bring each work-piece successively into that path which, by reciprocation of the table when locked to the slide, will pass the work-piece beneath the cutter. In Fig. 34, six work-pieces are distributed symmetrically about the center of the table; and six indexing movements are required to bring each work-piece successively, upon the return of the slide to its initial position, into such position that upon the next advance of the slide and table, the newly positioned work-piece will pass beneath the cutter.

In Fig. 32 two work-pieces or their equivalent in two rows of work-pieces were placed upon the table, and, as heretofore stated, an indexing movement of 180 degrees was required to position the new work-pieces in that path which, upon the next advance of the table, would carry the new work-pieces beneath the cutter. Similarly where, as in Fig. 34, six work-pieces are symmetrically placed upon the table, each indexing movement would be 60 degrees. Assuming now that the time required for indexing the 180 degrees, as in the method of use illustrated in Fig. 32, is 10 seconds, which is also the time required for the return movement of the slide if that slide is to be returned during the period of indexing, regardless of the length of this return movement, it is obvious that the time required for an indexing movement of 60 degrees in the method of use illustrated in Fig. 34 would be only one-third of the time required for indexing 180 degrees, or $3\frac{1}{3}$ seconds. If the return movement of the slide is to be made within the period of this indexing movement, the return movement would, therefore, be required to be three times as fast as the return movement when indexing 180 degrees.

The gears 33, 34, 35 and 36 (Fig. 26) are correspondingly changed to provide for such greater speed.

It will be realized from the foregoing description that the method of milling by a reciprocation of the slide and indexing of the work-table thereon, the movements of which are illustrated by Figs. 32, 33 and 34, is a continuous method of milling in a straight line, the work-pieces being set and removed while the cutter is working on others; and it is especially the simultaneous indexing and return movement which results in the great saving of time of operation.

*Hand drive of the slide and table.*

Feed screw 63 (Figs. 12 and 27) for the movement of the slide 60, and shaft 86 for the movement of the circular table 61, may be driven also by hand, using the hand wheel 241 (Figs. 1 and 27), from which motion is transmitted over shaft 242. bevelled gears 243 and 244 (Figs. 3, 12 and 27) to gear 92 and gear 65, resulting in a movement of the slide 60 or table 61, depending upon which of the clutches 67 or 158, respectively, is engaged. For the operation of these clutches hand levers are provided conveniently located to the operator. The clutch 158 is operated by hand lever 245 and clutch 67 is operated by hand lever 246 (Figs. 1 and 12). In addition, clutch 71 (Fig. 26), transmitting rotation from shaft 53 to gear 68, is hand operated by hand lever 247 (Fig. 1).

Whenever the hand drives for the slide and table are used, clutch 71, which transmits the power drive from shaft 53, will be kept disengaged to separate the train of gears required for the power drive from the gears required for the hand drive, thus facilitating an easy operation of the latter.

For setting-up purposes, main feed shaft 5, from which all driving movements are derived, is provided with the clutch teeth 248 (Fig. 5) which may be engaged by a co-operative clutch toothed crank handle (not shown) to facilitate all movements of the slide and table derived by hand.

The setting of the dogs in their proper positions required for the work and the method of milling employed is, therefore, made easy and convenient for the operator.

The operation of my improved milling machine has been set forth in connection with the foregoing description of the details thereof, and it is not believed that an additional and formal statement of its operation is essential to understand the principles of my invention as embodied in the machine or in the methods of milling thereby. One other method of milling which may be performed and which has not been specifically set forth, however, is within the contemplation of my invention. Assuming that the work-table is in one of the end positions of its reciprocatory movement,—for example, the position indicated by numeral 233 (Fig. 32), and with two work-pieces to be milled placed symmetrically thereon with respect to the center of the table, as indicated by the numerals 234 and 235,—the work-table is advanced from the position 233 to the position 237 past and beyond the cutter, during which advance the work-piece 234 on the table in line with the cutter is milled and finished. Then at the extreme position 237 of the straight-line path opposite the initial position 233, and before beginning the return in the straight-line path, the work-table is indexed to interchange the positions 238 and 236 of the unfinished and finished work-pieces, so that the unfinished work-piece is brought into the straight-line path with the cutter. The work-table is then returned—or, in other words, advanced toward its initial position 233, during which movement the theretofore unfinished work-piece is milled, and also during which movement the work-piece finished upon the first-mentioned advance is removed and a new work-piece substituted. When the initial position 233 is again attained, the cycle of movements is repeated by first indexing the table to interchange the positions of the last finished and unfinished work-pieces, and by again advancing the table for straight-line milling and by again during such advance removing the last finished work-piece and substituting a new work-piece therefor. This method of milling, it is to be observed, is a practically continuous one, and very economical in the saving of time, the only time lost from the straight-line movement of the table in straight-line milling being the indexing movement of the table at the opposite extremities of the straight-line path.

Having particularly described my invention, what I claim and desire to secure by Letters Patent is:

1. In a milling machine, a cutter, a work-table, means for bodily reciprocating one of said parts relative to the other to cause said cutter to describe a straight-line path across said work-table, means adapted to be actuated into operation for imparting rotary movement to said work-table, and means operated by rectilinear movement of said reciprocating part in either direction of its reciprocation to actuate said second-mentioned means into operation.

2. In a milling machine, a cutter, a work-table, driving mechanism for reciprocating said work-table, separate driving mechanism for rotatably indexing said work-table adapted to be actuated into operation, and means operated by rectilinear movement of said work-table in either direction of its reciprocation to actuate said separate driving mechanism into operation.

3. In a milling machine, a cutter, a work-table, mechanism for imparting reciprocatory movement to said work-table, mechanism for imparting a rotary movement to said table, said second mentioned mechanism having a part manually movable to throw said second-mentioned mechanism into and out of operation, lock-means normally in operative position to prevent rotary movement of said table and movable to inoperative position, and means actuated by said part in its movement to throw said second mentioned mechanism into operation to move and retain said lock-means in inoperative position.

4. In a milling machine, a cutter, a table mounted for reciprocatory and rotary movements, driven mechanisms to reciprocate and to rotate said table, slow and fast driving means adapted to be connected to each of said mechanisms and means automatically operated by the table movements for connecting and disconnecting said driving means.

5. In a milling machine, a cutter, a work-table mounted for reciprocatory and rotative movements, driven mechanisms for imparting reciprocatory and rotary movements to said table, a single driving shaft, variable speed transmission mechanism adapted to connect said shaft with each of said driven mechanisms alternately and means cooperating with said variable speed transmission mechanism and automatically operated by said table movements for effecting change in speed of said table movements.

6. In a milling machine, a cutter, a work-table, means for moving said work-table in a straight path relative to said cutter and at a variable speed, means for moving said work-table to cause portions thereof to describe a circular path relative to said cutter, and at a variable speed, both said means including driving and driven elements and variable speed transmission mechanism and means cooperating with said variable speed transmission mechanism and automatically operated by the table movements for effecting change in speed of said table movements.

7. In a milling machine, a work-table, a cutter mounted above said work-table, means for moving said work-table in a straight path beneath said cutter and means for moving said work-table to cause portions thereof to describe a circular path beneath said cutter, and a common means automatically operated by movement of said work-table for reversing the direction of said movements.

8. In a milling machine, a cutter, a work-table, means for reciprocating said work-table, mechanism for imparting movement in partial rotation to said work-table, a shiftable element normally holding said mechanism out of operation and shiftable to throw said mechanism into operation, and means actuated by rectilinear movement of said work-table to shift said element to throw said mechanism into operation.

9. In a milling machine, a work-table, a cutter mounted above said work-table to one side of the center thereof, means for reciprocating said work-table past said cutter to bring a work-supporting portion of said table on the same side of its center as said cutter in a straight-line path beneath and beyond said cutter and back to initial position, means adapted to be actuated into and out of operation for imparting successive partial rotations to said table about said center to bring work-supporting portions of said table distributed about said center successively into the path described by the straight-line movement of said first-mentioned work-supporting portion, and actuating means operated by movement of said table in said straight-line path to actuate said second mentioned means into and out of operation.

10. A mechanism for effecting a feed and a quick traverse, comprising a table, a single driving mechanism for said table, a differential gear connected to said driving mechanism, a power shaft, a relatively slow transmission and a relatively fast transmission between said power shaft and said differential gear, and clutch mechanisms adapted to connect said transmissions with said power shaft and said differential gear.

11. A mechanism for effecting a feed and a quick traverse, comprising, in combination, a table, driving mechanism for said table, a differential gear mechanism connected to said driving mechanism, a power shaft, a relatively slow transmission and a relatively fast transmission between said power shaft and said differential gear mechanism, and clutch mechanisms adapted to connect said transmissions with said power shaft and said differential gear mechanism.

12. In a milling machine, a cutter, a work-table mounted for reciprocatory and rotary movements, a driving shaft for said reciprocatory movement, a driving shaft for said rotary movement, a power shaft, a shaft intermediate said power shaft and said driving shafts and means to simultaneously or alternately connect said intermediate shaft to said driving shafts, and a relatively slow speed transmission and a relatively fast speed transmission extending from said power shaft and adapted to be alternately connected to said intermediate shaft.

13. In a milling machine, a cutter, a work-table mounted for reciprocatory and rotary movements, a driving shaft for said reciprocatory movement, a driving shaft for said rotary movement, a power shaft, a shaft intermediate said power shaft and said driving shafts and means to simultaneously or alternately connect said intermediate shaft to said driving shafts, a relatively slow speed transmission and a relatively fast speed transmission extending from said power shaft and adapted to be alternately connected to said intermediate shaft and reversing mechanism for reversing the direction of movement imparted to said intermediate shaft.

14. An automatic table propelling mechanism combining a movable table, a differential speed transmission connected to said table and adapted to move said table at a slow or fast speed, slow and fast driving mechanisms adapted to be connected to and disconnected from said differential speed transmission, means for connecting said slow driving mechanism to said differential speed transmission, and means operable by the movement of said table for connecting to and disconnecting said fast driving mechanism from said differential speed transmission.

15. An automatic table propelling mechanism combining a movable table, two members mounted adjacent said table, each for separate movement to one position and provided with a contact surface, a fast dog movable with said table adapted to impact a contact surface on one of said members to move said member into said one position, a second dog movable with said table adapted to impact the contact surface on the other of said members to move the other of said members into said one position, a propelling mechanism for imparting slow or fast speed to said table, and a single shift mechanism controlled by said members and adapted in the one position of one of said members to cause said propelling mechanism to slowly advance said table and in the one position of the other said member to rapidly advance said table.

16. An automatic table propelling mechanism combining a rotatable table, two members adjacent said table, each provided with a contact surface, a first dog movable in a circular path by said table adapted to impact a contact surface on one of said members to move said member into one position, a second dog movable in a circular path of said table adapted to impact the contact surface on the other said member to move the other said member into one position, a propelling mechanism for impacting slow or fast speed of rotation to said table, and a shift mechanism controlled by said members and adapted in the one position of one of said members to cause said propelling mechanism to slowly rotate said table and in the one position of the other said mechanism to rapidly rotate said table.

17. In a milling machine, a cutter, a work-table mounted for movement in a straight path relative to said cutter and for rotation upon an axis eccentric to said cutter, table propelling mechanism for said straight-line movement, table propelling mechanism for said rotary movement, a driving mechanism shiftable to impart slow or fast speed to said table and clutch mechanism adapted to alternately connect said driving mechanism to each of said table propelling mechanisms to alternately advance said table in said straight-line and said rotary movements, a shift mechanism for said driving mechanism, and means operable by the movement of said table in said straight-line or said rotary movement to operate said shift mechanism.

18. In a milling machine, a cutter, a table mounted for reciprocatory movement past said cutter, and for rotary movement upon an axis eccentric to said cutter, table propelling mechanism for said reciprocatory movement, table propelling mechanism for said rotary movement, a driving mechanism for imparting slow or fast speed to said table and clutch mechanism adapted to alternately connect said driving mechanism to each of said table propelling mechanisms to alternately reciprocate and rotate said table, a shift mechanism adapted in one position to cause said driving mechanism to slowly advance said table and in another position to cause said driving mechanism to rapidly advance said table, members movable to shift said shift mechanism to the said one and the other positions extending into the path of movement of said table in the reciprocation and rotation of said table, and dogs movable with said table in its reciprocatory and rotary movements to contact and move said members.

19. In a milling machine, a table mounted for movements in opposite directions in a rectilinear and in a circular path, propelling mechanisms shiftable to impart slow or fast speeds to said table in said paths of movements, shiftable reversing mechanism, and shift mechanisms for said propelling and reversing mechanisms adapted to be operated by movements of said table.

20. In a milling machine, a table mounted for movements in opposite directions in a rectilinear and in a circular path, propelling mechanisms shiftable to impart slow or fast speed to said table in said paths of movements, a shiftable reversing mechanism, and separate shift mechanisms for said propelling and reversing mechanisms adapted to be operated by movements of said table in either direction in either of said paths of movements.

21. In a milling machine, a table movable in opposite directions in the same linear path, propelling mechanism for imparting a slow or a fast speed to said table, a reversing mechanism shiftable to reverse the direction of movement of said table, means to shift said reversing mechanism including a member movable in opposite directions to effect said shifting, a mounting for said member maintaining the same always in operative position for said movements in opposite directions to effect said shifting, and dogs adjustably mounted upon said table and adapted to contact said member in opposite directions of movement to impart said movements in opposite directions thereto.

22. In a milling machine, a table mounted for reciprocatory and rotary movements, table propelling mechanism for said reciprocatory movement, table propelling mechanism for said rotary movement, slow speed driving means and fast speed driving means, clutch means for connecting and disconnecting said slow and fast driving means with said table propelling mechanism and means automatically operated by said table movements for operating said clutch means.

23. In a milling machine, a table mounted for reciprocatory and rotary movements, table propelling mechanism for said reciprocatory movement, table propelling mechanism for said rotary movement, slow speed driving means and fast speed driving means, clutch means for connecting and disconnecting said slow and fast speed driving means with said table propelling mechanisms, and clutch shifting means automatically operating in timed relation with the reciprocatory and rotary movements of said table for operating said clutch means.

24. In a milling machine, a table mounted for reciprocatory and rotary movements, table propelling mechanism for said reciprocatory movement, table propelling mechanism for said rotary movement, a single driving shaft, means for imparting alternately a slow and a fast speed to said shaft, and clutch means automatically operating in timed relation with the reciprocatory and rotary movements of said table for connecting said driving shaft to either of said table propelling mechanisms.

25. In a milling machine, a table mounted for reciprocatory and rotary movements, table propelling mechanisms for said reciprocatory and rotary movements, slow speed driving means and fast speed driving means, clutch means for connecting and disconnecting said slow and fast speed driving means with said table propelling mechanisms, clutch shifting means, reversing mechanism shiftable to reverse the direction of said slow and fast speed driving means, and shifting mechanisms including dogs adjustably mounted on said table adapted to be operated by rotary and reciprocatory movements of said table to shift said clutch means and reversing mechanism.

26. A speed change mechanism of the nature disclosed comprising a slow speed shaft adapted to rotate in one direction, a gear frame mounted for rotation upon an axis coincident with the axis of said slow speed shaft in a direction opposite to the direction of rotation of said slow speed shaft, a second shaft mounted for rotation upon an axis coincident with the axis of rotation of said gear frame, gears upon said shafts intermeshing with gears in said frame, driving mechanism adapted to rotate said second shaft at high speed relative to said first-mentioned shaft, and in a direction of rotation opposite to the direction of rotation of said first-mentioned shaft, and a clutch mechanism for connecting and disconnecting said driving mechanism from said second-mentioned shaft.

27. A speed change mechanism of the nature disclosed, comprising a slow speed shaft adapted for rotation in one direction, a second shaft, a transmission mechanism adapted to impart a like speed of rotation from said slow speed shaft to said second shaft but in an opposite direction, said transmission mechanism comprising a gear on each of said shafts and intermediate gearing intermeshing with each of said gears on said shafts, and capable of revolution on said gear on said slow speed shaft in a direction opposite to the direction of rotation of said shaft, a driving mechanism adapted to rotate said second-mentioned shaft at relatively high speed in a direction opposite to the direction of rotation of said slow speed shaft, and clutch mechanism for connecting and disconnecting said driving mechanism from said second shaft.

28. A speed change mechanism of the nature disclosed, comprising a slow speed shaft adapted to rotate in one direction, a second rotatable shaft, a gear on each of said shafts, a gearing intermeshing with the gears on said shafts and revolvable thereon, means for restraining said gearing from revolution in the direction of rotation of said slow speed shaft, a driving mechanism for rotating said second shaft at relatively high speed in a direction opposite to the rotation of said slow speed shaft, and a clutch mechanism for connecting and disconnecting said driving mechanism from said second shaft.

29. In a milling machine, a work driving mechanism therefor, a power shaft, a slow speed shaft, reducing gearing and a clutch mechanism adapted to connect and disconnect said slow speed shaft with said power shaft for rotation in one direction, a second shaft, a gear on each of said shafts, a gearing intermeshing with the gears on said shafts and revolvable thereon, means for restraining said gearing from revolution in the direction of rotation of said slow speed shaft, gearing and a clutch mechanism to connect said second shaft with said power shaft for rotation at high speed in a direction opposite to that of said slow speed shaft and to disconnect said second shaft from said power shaft, and means connecting said second shaft with said driving mechanism.

30. In a milling machine, a work-table, driving mechanism therefor, a shaft rotating at slow speed, a second rotatable shaft, a differential transmission between said shafts adapted to transmit the speed of rotation of the first-mentioned shaft to said second-mentioned shaft but permitting a higher speed of rotation of said second shaft, means for imparting said higher speed of rotation directly to said second shaft and for discontinuing said higher speed, and means connecting said second shaft with said driving mechanisms.

31. A speed change mechanism of the nature disclosed combining a travelling support, a slow and a fast drive therefor, a pair of control mechanisms for said drives, one of said control mechanisms being adapted in alternative positions to cause said support to travel rapidly and slowly when the other of said control mechanisms is in a predetermined position, manually operable means for moving said other control mechanism into said predetermined position, and dogs on said support adapted to move said first-mentioned control mechanism alternately into fast and slow position and said other control mechanism out of said predetermined position.

32. A speed change mechanism of the nature disclosed combining a travelling support, a slow and a fast drive therefor, and a reversing mechanism for said drives, a pair of control mechanisms for said drives and a third control mechanism for said reversing mechanism, one of said pair of control mechanisms for said drives being adapted in alternative positions to cause said support to travel rapidly and slowly when the other of said pair of control mechanisms is in a predetermined position, dogs on said support adapted to move said first-mentioned control mechanism alternately into fast and slow position and another dog on said support adapted to actuate said third control mechanism to actuate said reversing mechanism.

33. A speed change mechanism of the nature disclosed combining a travelling support, a slow and a fast drive therefor, a pair of control mechanisms for said drives, the one mechanism being adapted in alternative positions to cause said support to travel rapidly and slowly when said other mechanism is in a predetermined position, dogs on said support adapted to move said first-mentioned mechanism alternately into its fast and slow positions, and another dog on said support adapted to move said first-mentioned mechanism out of its predetermined position.

34. A mechanism for effecting a feed and a quick traverse, comprising a table, a table propelling mechanism, a slow drive and a fast drive, separately operable clutch mechanisms to connect and disconnect said drives to and from said table propelling mechanism, manually operable means to operate the clutch mechanism for said slow drive to connect said slow drive to said propelling mechanism and a member movable to operate said clutch mechanism to disconnecting position, a second member movable to operate the clutch mechanism for said fast drive in connecting and disconnecting position, a reversing mechanism for said drives and a member movable to operate said reversing mechanism, and dogs upon said table positioned to contact and move said movable members to disconnect said slow drive, connect said fast drive, and operate said reversing mechanism.

35. A speed change mechanism of the nature disclosed, combining a travelling support, a slow and a fast drive therefor and a reversing mechanism for said drives, a pair of control mechanisms for said drives and a control mechanism for said reversing mechanism, one of said pair of control mechanisms being adapted in alternative positions to cause said support to travel rapidly and slowly when the other of said pair of control mechanisms is in a predetermined position, dogs on said support adapted to move said first-mentioned control mechanism alternately into fast and slow position, and another dog on said support adapted to move the other of said pair of control mechanisms out of its predetermined position and still another dog on said support adapted to move said control mechanism to operate said reverse mechanism.

36. A mechanism for effecting a feed and a quick traverse, comprising a table, a table propelling mechanism, a differential transmission connected to said table propelling mechanism and adapted to impart different speeds thereto, a relative slow drive and a relatively fast drive and clutch mechanism for each of said drives adapted to connect and disconnect said drives to and from said differential transmission, a reversing mechanism in said differential transmission adapted to reverse the direction of transmitted movement, and dogs upon said table positioned in series to operate said clutch mechanism and said reversing mechanism.

37. A speed change mechanism of the nature disclosed combining a travelling support, a propelling mechanism therefor, a differential transmission connected to said propelling mechanism and adapted to be connected simultaneously or alternately to a slow and fast drive and to transmit a single driving movement unaltered or the faster of two simultaneous driving movements a relatively slow and a relatively fast drive and clutch mechanism for each of said drives adapted to connect and disconnect said drives to and from said differential transmission, means for manually operating said slow clutch to connecting position and dogs upon said travelling support adapted to move said fast clutch into connecting and disconnecting positions and to move said slow clutch to disconnecting position.

38. A mechanism for effecting a feed and a quick traverse and reverse, comprising a table, a table propelling mechanism, a differential transmission connected to said table propelling mechanism and adapted to be connected simultaneously or alternately to a slow and fast drive and to transmit a single driving movement unaltered or the faster of two simultaneous driving movements, a relatively slow and a relatively fast drive and clutch mechanism for each of said drives adapted to connect and disconnect said drives to and from said differential transmission, a reversing mechanism connected with said transmission adapted to reverse the direction of transmitted motion, members adjacent said table and movable to operate said clutch and reversing mechanisms, and dogs upon said table positioned to contact said members to operate said clutch and reversing mechanisms to successively engage said fast drive, operate said reversing mechanism and disengage said fast and slow drives.

39. A mechanism for effecting a feed and a quick traverse and reverse comprising a table, a table propelling mechanism, a differential transmission connected to said propelling mechanism and adapted to be connected simultaneously or alternately to a slow and a fast drive and to transmit a single driving movement unaltered or the faster of two simultaneous driving movements, a relatively slow and a relatively fast drive and clutch mechanism for each of said drives adapted to connect and disconnect said drives to and from said differential transmission, a reversing mechanism connected with said transmission adapted to reverse the direction of transmitted motion, a manually operable means for moving said clutches to connecting position, and members adjacent said table and movable to operate said slow clutch to disconnecting position, said fast clutch to connecting and disconnecting positions and said reversing mechanism, and dogs adjustably positioned upon said table to contact said members and successively operate said fast clutch to disconnecting and connecting position, during a desired length of travel of the table in one direction, and to operate said reversing mechanism to reverse the direction of said travel.

40. In a milling machine, a cutter, a table mounted for straight-line and rotary movement, driving mechanism for said straight-line movement in either direction, driving mechanism adapted while in operation to continuously rotate said table and other driving mechanism adapted to rotate said table through predetermined degrees of rotation.

41. In a milling machine, a cutter, a table mounted for reciprocatory movement past said cutter for straight-line milling, for complete rotary movement upon an axis eccentric to said cutter for circular milling, and for partial rotative movement upon the same axis for indexing, driving mechanism operable at will to simultaneously or alternately drive said table in said straight-line and said indexing movement, and driving mechanism operable only when said first-mentioned driving mechanism is not in operation for driving said table in complete rotation.

42. In a milling machine, a cutter, a table mounted for reciprocatory movement past said cutter for straight-line milling, for complete rotation for circular milling and for partial rotation for indexing, driving mechanisms for moving said table in said straight-line milling, said circular milling, and said indexing, means manually operable to throw said driving mechanisms into and out of operation and other means operated by the movements of said table for automatically throwing the driving mechanism for indexing into and out of operation.

43. In a milling machine, a cutter, a table mounted for reciprocatory movement past said cutter for straight-line milling, for complete rotary movement for circular milling, and for partial rotative movement for indexing, driving mechanisms for said straight-line milling, said circular milling and said indexing, and means to throw said driving mechanisms into and out of operation, the means to throw said indexing driving mechanism into operation being adapted to lock said circular milling driving mechanism in inoperative position.

44. In a milling machine, a cutter, a table mounted for reciprocatory movement past said cutter for straight-line milling, for complete rotary movement for circular milling, and for partial rotative movement for indexing, driving mechanisms for said straight-line milling, for said circular milling and said indexing, and means to throw said driving mechanisms into and out of operation, the means to throw said circular milling driving mechanism into operation being adapted to lock said indexing driving mechanisms in inoperative position.

45. In a milling machine, a cutter, a table mounted for reciprocatory movement past said cutter for straight-line milling, for complete rotation for circular milling, and for partial rotation for indexing, driving mechanisms for moving said table in said straight-line milling, said circular milling and said indexing, and means to throw said driving mechanisms into and out of operation, the means to throw either said circular milling driving mechanism or said indexing driving mechanism into operation being adapted to lock the other in inoperative position.

46. In a milling machine, a cutter, a work-table mounted for reciprocatory movement past said cutter for straight-line milling and for rotative movement for indexing, driving mechanisms for said straight-line milling and said indexing, means manually operable at will for throwing said indexing driving mechanism into operation, and means operated by the movement of said table in said reciprocatory path to automatically throw said indexing driving mechanism into operation.

47. In a milling machine, a cutter, a work-table mounted for reciprocatory movement past said cutter for straight line milling and for rotative movement for indexing, variable speed driving mechanism for said reciprocatory movement, a constant speed driving mechanism for said rotative movement normally out of operation and adapted to be actuated into operation, and means automatically operated by rectilinear movement of said table for actuating said constant speed driving mechanism into operation.

48. In a milling machine, a cutter, a work-table mounted for reciprocatory movement past said cutter for straight-line milling and for rotative movement for indexing, mechanisms to drive said table for said straight-line milling and said indexing, means automatically operated by the movement of said table in said straight line for throwing said indexing mechanism into operation and means automatically operated by the movement of said table in rotation for throwing said indexing mechanism out of operation.

49. In a milling machine, a cutter, a work-table mounted for reciprocatory movement past said cutter for straight-line milling and for rotative movement for indexing, mechanisms to drive said table for said straight-line milling and said indexing, means manually operable at will to throw said indexing mechanism into operation and means automatically operated by the indexing movement of said table for throwing said indexing mechanism out of operation.

50. In a milling machine, a cutter, a support mounted for reciprocatory movement past said cutter, a work-table mounted upon said support for rotation, driving mechanisms for reciprocating said support to move said table therewith for straight-line milling, driving mechanism for completely rotating said table upon said support for circular milling, and driving mechanism for partially rotating said table upon said support for indexing said table, locking mechanism normally in position to lock said table immovable relative to said support, and means manually operable at will for moving said locking mechanism to unlocking position.

51. In a milling machine, a cutter, a support mounted for reciprocatory movement past said cutter, a work-table mounted upon said support for rotation, driving mechanism for reciprocating said support to move said table therewith for straight-line milling, driving mechanism for completely rotating said table upon said support for circular milling, and driving mechanism for partially rotating said table upon said support for indexing said table, locking mechanism normally in position to lock said table immovable relative to said support and means automatically operated by the movement of said support in its straight-line travel for moving said locking mechanism to unlocking position.

52. In a milling machine, a cutter, a support mounted for reciprocatory movement past said cutter, a work-table mounted upon said support for rotation, driving mechanism for reciprocating said support to move said table therewith for straight-line milling, driving mechanism for completely rotating said table upon said support for circular milling, driving mechanism for partially rotating said table upon said support for indexing said table, locking mechanism normally in position to lock said table immovable relative to said support and means automatically operated by the movement of said support in its straight-line travel for moving said locking mechanism to unlocking position, and means associated with and operated by said locking mechanism in its movement to unlocking position to lock said driving mechanism for said indexing in inoperative position but permitting the operation of said driving mechanism for said rotation of said table for circular milling.

53. In a milling machine, a cutter, a support mounted for reciprocatory movement past said cutter, a work-table mounted upon said support for rotation, driving mechanism for reciprocating said support to move said table therewith for straight-line milling, driving mechanism for completely rotating said table upon said support for circular milling, driving mechanism for partially rotating said table upon said support for indexing said table, locking mechanism normally in position to lock said table immovable relative to said support and means automatically operated by the movement of said support in its straight-line travel for moving said locking mechanism to unlocking position, and means associated with and operated by said locking mechanism in its movement to unlocking position to throw said driving mechanism for said rotation of said table in circular milling into operation.

54. In a milling machine, a cutter, a support mounted for reciprocatory movement past said cutter, a work-table mounted upon said support for rotation, driving mechanism for reciprocating said support to move said table therewith for straight-line milling, driving mechanism for completely rotating said table upon said support for circular milling, driving mechanism for partially rotating said table upon said support for indexing said table, locking mechanism normally in position to lock said table immovable relative to said support and means automatically operated by the movement of said support in its straight-line travel for moving said locking mechanism to unlocking position, and means associated with and operated by said locking mechanism in its movement to unlocking position to throw said driving mechanism for said rotation of said table in circular milling into operation and to lock said driving mechanism for said indexing of said table in inoperative position.

55. In a milling machine, a cutter, a table mounted for reciprocatory movement past said cutter for straight-line milling, for complete rotation for circular milling, and for partial rotation upon said axis for indexing, separate driving mechanisms for said three movements, a single driving shaft and transmission mechanism adapted to impart movement to said driving mechanisms from said driving shaft.

56. In a milling machine, a cutter, a table mounted for reciprocatory movement past said cutter for straight milling, for complete rotation for circular milling, and for partial rotation upon an axis eccentric to said cutter for indexing, separate driving mechanisms for said three movements, a single driving shaft and transmission mechanism adapted to simultaneously or alternately connect said driving shaft with the mechanism for driving said table in straight-line milling and indexing and to singly connect said driving shaft with driving mechanism for circular milling.

57. In a milling machine, a cutter, a table mounted for reciprocatory movement past said cutter for straight-line milling, for complete rotation for circular milling and for partial rotation upon said axis for indexing, separate driving mechanisms for moving said table in said three movements, a single constant-speed driving shaft, transmission mechanism adapted to impart variable speeds to said driving mechanisms for said straight-line and circular driving mechanisms from said single driving shaft and other transmission mechanism adapted to impart a constant speed to said driving mechanism for said indexing from said single driving shaft.

58. In a milling machine, a cutter, a table mounted for reciprocatory movement past said cutter for straight-line milling, for complete rotation for circular milling, and for partial rotation upon said axis for indexing, driving mechanisms for each of said movements, a constantly rotating prime mover shaft, a variable speed transmission mechanism extending from said prime mover shaft, clutch mechanism operable to connect said variable speed transmission to said driving mechanism for said reciprocatory movement and said driving mechanism for said complete rotation of said table, and a constant speed transmission extending from said prime mover shaft and clutch mechanism operable to connect said constant speed transmission to said indexing driving mechanism.

59. In a milling machine, a cutter, a support mounted for reciprocatory movement past said cutter, a table mounted on said support for rotary movement, means for reciprocating said support, a circular gear upon said table, a shaft journalled in said support for rotation in and bodily translatable with said support, a gear mounted for rotation with said shaft, adapted to co-act with said circular gear to rotate said table, and means to rotate said shaft including a second shaft rotatably mounted parallel to the direction of movement of said support and restrained from linear movement, and a gear splined on said second shaft and translatable with said support.

60. In a milling machine, a cutter, a support mounted for reciprocatory movement past said cutter, a table mounted on said support for rotary movement, means for reciprocating said table, a circular gear upon said table, a shaft journalled in said support for rotation in and bodily translatable with said support, a second gear mounted for rotation with said shaft adapted to co-act with said first or circular gear to rotate said table, a third gear mounted on said shaft, a second shaft rotatably mounted parallel to the direction of movement of said support and restrained from linear movement, a fourth gear splined upon said second shaft and translatable in fixed relation with said support, other gears journalled in said support intermediate said third and fourth gears and in constant engagement therewith, and means to rotate said second shaft.

61. In a milling machine, a cutter, a support mounted for reciprocatory movement past said cutter, a table mounted on said support for rotary movement, a nut attached to and translatable with said support, a screw-shaft mounted parallel to the direction of movement of said support for rotation in threaded engagement with said nut and restrained from linear movement, a circular gear upon said table, a second shaft journalled in said support for rotation in and bodily translatable with said support, a gear mounted for rotation with said second shaft, adapted to co-act with said circular gear to rotate said table, and means to rotate said second shaft including a third shaft rotatably mounted parallel to the direction of movement of said support and restrained from linear movement, and a gear splined upon said third shaft and translatable with said support.

62. In a milling machine, a cutter, a support mounted for reciprocatory movement past said cutter, a table mounted on said support for rotary movement, a nut attached to and translatable with said support, a screw-shaft mounted parallel to the direction of movement of said support for rotation in threaded engagement with said nut and restrained from linear movement, a circular gear upon said table, a second shaft journalled in said support for rotation in and bodily translatable with said support, a second gear mounted for rotation with said second shaft adapted to co-act with said first or circular gear to rotate said table, a third gear mounted on said second shaft, a third shaft rotatably mounted parallel to the direction of movement of said support and restrained from linear movement, a fourth gear splined upon said third shaft and translatable in constant relation with said support, other gears journalled in said support intermediate said third and fourth gears and in constant engagement therewith, and means to rotate said first and third shafts.

63. In a milling machine, a cutter, a support mounted for reciprocatory movement past said support, a table mounted on said support for complete or partial rotation, means for reciprocating said support, a complete circular gear upon said table, a broken circular gear upon said table, a shaft journalled in said support adjacent said complete circular gear, a second shaft journalled in said support adjacent said broken circular gear, said shafts being bodily translatable with said support, a pair of gears, one on each of said shafts adapted to be moved into and out of engagement respectively with one and the other of said gears on said table and to be rotated by rotation of said shafts to rotate said table, a second pair of gears, one on each of said shafts, adapted to rotate said shafts, a third shaft rotatably mounted parallel to the direction of movement of said support and restrained from linear movement, a fifth gear splined on said third shaft and translatable in fixed relation with said support, other gears journalled in said support and in constant engagement with said second pair of gears and said fifth gear, means to rotate said third shaft, and means to alternately move said gears of said first pair into and out of engagement with said complete and said broken circular gears on said table, respectively.

64. In a milling machine, a cutter, a support mounted for reciprocatory movement past said support, a table mounted on said support for complete or partial rotation, means for reciprocating said support, two circular gears upon said table, two shafts journalled in said support for rotation relative to said support and bodily translatable with said support, gears upon said shafts, one on each, adapted to be rotated by rotation of said shafts and to be moved into and out of engagement respectively with one and the other of said circular gears upon said table, to rotate said table, a second pair of gears, one on each of said shafts, a third shaft rotatably mounted parallel to the direction of movement of said support and restrained from linear movement, a fifth gear splined on said third shaft and translatable in constant relation with said support, other gears journalled in said support intermediate said fifth gear and said second pair of gears and in engagement with said second pair of gears and said fifth gear, means to rotate said third shaft, and means to alternately move said gears of said first pair into and out of engagement with said respective circular gears.

65. In a milling machine, a work-table designed for rotation through predetermined degrees, comprising a circular gear upon said table having cut-out portions spaced said predetermined number of degrees apart, and a driving pinion designed to engage said gear.

66. In a milling machine, a work-table designed for rotation through predetermined degrees, comprising a circular gear upon said table having cut-out portions spaced said predetermined number of degrees apart, said cut-out portions being of less width than the face of said gear and leaving a rim of continuous gear teeth, a rotating driving shaft mounted on a fixed support relative to said table and adjacent said gear, a pilot gear loosely mounted on said driving shaft in fixed axial position in constant engagement with said circular gear in said rim portion, a driving gear mounted for rotation with said driving shaft and movable axially of said shaft, the adjacent faces of said pilot gear and said driving gear having clutch teeth adapted for co-operative engagement, and means for moving said driving gear axially of said shaft into and out of clutching engagement with said pilot gear.

67. In a milling machine, a work-table, a table driving mechanism comprising a rack on said table, a driving shaft mounted for rotation upon a fixed support relative to said table, a pinion mounted for rotation with and for sliding axial movement on said shaft to positions into and out of engagement with said rack, means yieldingly restraining said pinion in position out of engagement with said rack and manually operable means for moving said pinion into engaging position with said rack.

68. In a milling machine, a cutter, a support mounted for reciprocatory movement past said cutter, a table mounted upon said support for rotatory movement, means for reciprocating said support, and mechanism for imparting rotary movement to said table comprising a circular rack upon said table, a driving shaft mounted for rotation in and bodily translatable with said support, a pinion mounted for rotation with and for sliding axial movement on said shaft to positions into and out of engagement with said rack, means yieldingly restraining said pinion in position out of engagement with said rack, and means operated by the straight-line movement of said support to move said pinion into engaging position with said rack.

69. In a milling machine, a cutter, a support mounted for reciprocatory movement past said cutter, a table mounted upon said support for rotary movement, means for reciprocating said support, and mechanism for imparting a rotary movement to said table comprising a circular rack upon said table, a driving shaft therefor mounted for rotation in and bodily translatable with said support, a pinion mounted for rotation with and for sliding axial movement on said shaft to positions into and out of engagement with said rack, means yieldingly restraining said pinion in position out of engagement with said rack, means operated by the straight-line movement of said support to move said pinion into engaging position with said rack, a spring-pressed detent adapted to yieldingly retain said rack in said engaging position, and means operated by the rotary movement of said table for releasing said detent.

70. In a milling machine, a work-table designed for rotation through predetermined degrees, comprising a circular gear upon said table, a rotating driving shaft, a pilot gear loosely mounted on said driving shaft in fixed axial position in constant engagement with said circular gear adjacent an edge portion thereof, a driving gear mounted for rotation with said shaft and movable axially thereof towards and away from said pilot gear across the face of said circular gear, said pilot gear and said driving gear having co-operating clutch fingers on adjacent opposing sides, said circular gear having a face of sufficient width to permit engagement of said driving gear therewith both in and out of clutching relation with said pilot gear, said circular gear having cut-out portions spaced said predetermined number of degrees apart, said cut-out portions leaving a rim of teeth for the constant engagement of said pilot gear but adapted to cause said driving gear when in engagement with the circular gear to run out of mesh upon a cut-out portion, means yieldingly restraining said driving gear out of engagement with said pilot gear and beyond the face of said circular gear, means for moving said driving gear axially of said shaft across a cut-out portion on said circular gear into clutching engagement with said pilot gear to start said circular gear, means operated by the ensuing movement of the table to move said driving gear to an intermediate position out of clutching engagement with said pilot gear but in engagement with said circular gear to continue the driving of said circular gear until said driving gear runs upon a cut-out portion of said circular gear, and means then operating to restore said driving gear to its initial position.

71. In a milling machine, a cutter, a table mounted for reciprocatory and rotary movements relative to said cutter, table propelling mechanisms for said movements, driving means, clutch means for connecting and disconnecting said driving means with said table propelling mechanisms, and clutch operating means including actuated elements adjacent said table and actuating elements adjustable upon said table adapted in movements of said table to contact said actuated elements to operate said clutch operating means.

72. The method of machine milling upon a milling machine having a reciprocating and a rotatable table and having the cutting tool located to one side of the axis of rotation of said table in all positions of movement of said table, which comprises securing a work-piece upon said table to one side of the axis of said table to bring said work-piece in cutting relation to said cutting tool in the straight-line travel of said table, securing a succession of additional work-pieces upon said table eccentrically to the axis of said table, advancing said table to move said first-mentioned work-piece past said cutting tool to mill said work-piece, returning said table in said straight-line path to initial position and simultaneously with said return partially rotating said table to bring the next of said work-pieces into the path described by said first-mentioned work-piece, and again advancing said table to bring said next work-piece in said straight-line path into cutting relation with said cutting tool, and repeating said operations of returning, partially rotating and advancing said table until all of said work-pieces have successively been milled.

73. In a milling machine, a cutter, a worktable, means for reciprocating said work-table, mechanism for imparting movement in partial rotation to said work-table, a shiftable element normally holding said mechanism out of operation and shiftable to throw said mechanism into operation, and means actuated by rectilinear movement of said work-table in either direction of its reciprocation to shift said element to throw said mechanism into operation.

74. In a milling machine, a cutter, a work-table, means to impart reciprocatory movement to said work-table and means to impart rotary movement to said work-table, lock-means normally in operative position to prevent rotary movement of said table while permitting reciprocatory movement of said table, and releasing means actuated by rectilinear movement of said table in either direction of its reciprocation to move said lock-means to inoperative position.

75. In a milling machine, a cutter, a table mounted for reciprocatory and rotary movements relative to said cutter, a table propelling mechanism for said reciprocatory movement, a table propelling mechanism for said rotary movement, a power shaft, transmission means between said power shaft and said propelling mechanisms including movable clutch mechanisms for throwing said table propelling mechanisms into and out of actuation, and clutch moving means operated by rectilinear movement of said table in either direction of its reciprocation to move a clutch mechanism to actuate the propelling mechanism for said rotary movement.

76. In a milling machine, a cutter, a work-table, means to impart reciprocatory movement to said work-table and means to impart rotary movement to said work-table, lock-means yieldingly in operative position to lock said table against rotary movement and adapted to be actuated to inoperative position by reciprocatory movement of said table, detent-means for holding said lock-means in inoperative position during rotary movement of said table, and detent-releasing means actuated by rotary movement of said table.

77. A combined linear and rotary milling machine comprising the combination of a cutter spindle, a work table adapted to be moved bodily past the spindle in a linear path at cutting speed or to be continuously rotated past the spindle at cutting speed, power means including change gears selectively operative to either reciprocate the table in its linear path or to continuously rotate the table, and means for automatically controlling both said table movements.

78. A combined linear and rotary milling machine comprising the combination of a cutter spindle, a work table adapted to be moved bodily past the spindle in a linear path at cutting speed or to be continuously rotated past the spindle at cutting speed, power means beneath the table and operative either to reciprocate the table in its linear path or to continuously rotate the table, and means for automatically controlling both said table movements.

79. A combined linear and rotary milling machine comprising the combination of a cutter spindle, a work table adapted to be moved bodily past the spindle in a linear path at cutting speed or to be continuously rotated past the spindle at cutting speed, power means beneath the table and operative either to reciprocate the table in its linear path or to continuously rotate the table, and means automatically controlling one of the said table movements for intermittently imparting fast and slow speeds to the table in the feeding direction.

80. In a milling machine, the combination of a cutter spindle, a work table, power means operative either to reciprocate the table in a linear path or to rotate the table, and means automatically controlling the said rotary table movement for intermittently imparting fast and slow speeds thereto in the feeding direction.

81. In a milling machine, the combination of a cutter spindle, a work table, power means operative either to reciprocate the table in a linear path or to rotate the table, and means for automatically controlling either of the said table movements for intermittently imparting fast and slow speeds to the table in the feeding direction.

82. A combined linear and rotary milling machine comprising the combination of a cutter spindle, a work table adapted to be moved bodily past the spindle in a linear path at cutting speed or to be continuously rotated past the spindle at cutting speed, power means beneath the table, change speed gearing operated by the power means, and means whereby the power means operates through the said change speed gearing to either reciprocate the table in its linear path or to continuously rotate the table.

83. A combined linear and rotary milling machine comprising the combination of a cutter spindle, a work table adapted to be reciprocated bodily past the spindle in a linear path or to be continuously rotated past the spindle at cutting speed, a screw for reciprocating the table, gearing for operating the screw, mechanism for rotating the table, gearing for operating the said mechanism, a power shaft beneath the table, and means whereby the shaft may be operatively connected with either of the said gearing for operating either the screw or the said mechanism from the shaft.

84. In a milling machine, the combination of a rotary work support, a spindle adapted to support a milling cutter thereon adjacent the work support, means for causing a relative reciprocating movement between the cutter and support, means for automatically and synchronously rotatably indexing the support during the non-cutting relative reciprocating stroke between the cutter and support, the indexing operation being adapted to place an unmilled piece of work in front of the cutter ready for a milling operation thereon, and means whereby the support may be continuously rotated.

85. In a milling machine, the combination of a rotary work support, a spindle adapted to support a milling cutter thereon adjacent the work support, means for causing a relative reciprocating movement between the cutter and support, means for automatically and synchronously rotatably indexing the support during the non-cutting relative reciprocating stroke between the cutter and support, the indexing operation being adapted to place an unmilled piece of work in front of the cutter, ready for a milling operation thereon, and means whereby the indexing means may be made inoperative and certain of the second named means be connected to the support to continuously rotate the same.

86. In a milling machine, the combination of a cutter spindle, a work table adapted to be reciprocated bodily past the spindle in a linear path or to be continuously rotated past the spindle at cutting speed, a screw for reciprocating the table, gearing for operating the screw, mechanism including gearing for automatically rotatably indexing the table during the backward reciprocating stroke thereof, a power shaft beneath the table, and means whereby the shaft may be operatively connected with either of the said gearing for operating the screw to reciprocate the table or for operating certain of the said mechanism to continuously rotate the table.

87. In a milling machine, the combination of a work support, a spindle adapted to support a milling cutter thereon adjacent the work support, means for reciprocating the work support and at variable speeds in one direction, means for automatically and synchronously indexing the support during the backward movement thereof, the indexing operation being adapted to place an unmilled piece of work in front of the cutter ready for a milling operation thereon, and means whereby the said reciprocating means may be connected to the support to automatically and continuously rotate the same at variable speeds.

88. In a milling machine, the combination of a work support, a spindle adapted to support a milling cutter thereon adjacent the work support, means including a plurality of clutches for automatically reciprocating the support and at variable speeds in one direction, and means operated in synchronism with the reciprocating means for rotatably indexing the support in synchronism with and during its backward movement, the indexing operation being adapted to place an unmilled piece of work in front of the cutter ready for a milling operation thereon.

89. In a milling machine, the combination of a rotary work support, a spindle adapted to support a milling cutter thereon adjacent the work support, means for causing a relative reciprocating movement between the spindle and support, means for automatically rotatably indexing the support synchronously with and during the non-cutting relative reciprocating stroke between the spindle and support, the indexing operation being adapted to place an unmilled piece of work in front of the cutter ready for a milling operation thereon, and means for adjustably varying the indexing movement relative to the reciprocating movement whereby the table is indexed a distance corresponding to the number of work pieces thereon.

90. In a milling machine, the combination of a rotary work support, a spindle adapted to support a milling cutter thereon adjacent the work support, means for causing a relative reciprocating movement between the spindle and support, and means for automatically rotatably indexing the support through either a quarter or a half rotation synchronously with an during the non-cutting relative reciprocating stroke between the spindle and support, the indexing operation being adapted to place an unmilled piece of work in front of the cutter ready for a milling operation thereon.

91. In a milling machine, the combination of a slide, a rotary work support thereon, a spindle adapted to support a milling cutter thereon adjacent the work support, means for reciprocating the slide, means for locking the support against rotation on the slide, means for disengaging the said locking means at the end of a cut, means for automatically rotatably indexing the support synchronously with and during the backward movement of the slide, the indexing operation being adapted to place an unmilled piece of work in front of the cutter ready for a milling operation thereon, and a positively operated trip latch mechanism for preventing the engagement of the locking means until the work support is indexed to approximately the desired position.

92. In a milling machine, the combination of a slide, a rotary work support thereon, a spindle adapted to support a milling cutter thereon adjacent the work support, means for reciprocating the slide, means for locking the support against rotation on the slide, means for disengaging the said locking means at the end of a cut, a latch for holding the said means in its disengaged position, means for automatically rotatably indexing the support synchronously with and during the backward movement of the slide, the indexing operation being adapted to place an unmilled piece of work in front of the cutter ready for a milling operation thereon, and a trip mechanism for disengaging the latch to permit the locking of the work support at the end of the desired indexing movement.

93. In a milling machine, the combination of a slide, a rotary work support thereon, a spindle adapted to support a milling cutter thereon adjacent the work support, means for reciprocating the slide, means for locking the support against rotation on the slide, means for disengaging the said locking means at the end of a cut, a latch for holding the said means in its disengaged position, means for automatically rotatably indexing the support synchronously with and during the backward movement of the slide, the indexing operation being adapted to place an unmilled piece of work in front of the cutter ready for a milling operation thereon, and a trip mechanism connected to the indexing means for disengaging the latch to permit the locking of the work support at the end of the desired indexing movement, the said trip mechanism being adjustable whereby the support may be indexed through different angular distances.

94. In a milling machine, the combination of a rotary work support, a spindle adapted to support a milling cutter adjacent the work support, means for causing a relative reciprocating movement between the spindle and support, and means for automatically rotatably indexing the support during the non-cutting relative reciprocating stroke between the spindle and support, the indexing operation being adapted to place an unmilled piece of work in front of the cutter ready for a milling operation thereon, one of said means being adjustable for varying the relative speed between the reciprocating movement and the indexing movement whereby to provide proper clearance of the cutter between various pieces of work during the indexing operation.

In testimony that I claim the foregoing, I have hereunto set my hand this 19th day of May, 1921.

ALWIN B. BACHMANN.